(12) United States Patent
McGatha et al.

(10) Patent No.: US 7,676,741 B2
(45) Date of Patent: Mar. 9, 2010

(54) STRUCTURAL CONTEXT FOR FIXED LAYOUT MARKUP DOCUMENTS

(75) Inventors: Jesse D. McGatha, Sammamish, WA (US); Eric S Leese, Seattle, WA (US); Ahmet Gurcan, Mercer Island, WA (US); Ming Liu, Redmond, WA (US); Rodrigo Lopez, Bellevue, WA (US); Khaled S Sedky, Sammamish, WA (US); Oliver H Foehr, Mercer Island, WA (US); Jerry Dunietz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 919 days.

(21) Appl. No.: 11/275,856

(22) Filed: Jan. 31, 2006

(65) Prior Publication Data

US 2007/0180358 A1  Aug. 2, 2007

(51) Int. Cl.
 *G06F 17/00* (2006.01)
(52) U.S. Cl. .................. 715/234; 715/205; 715/243; 715/255; 715/273
(58) Field of Classification Search .............. 715/700, 715/200, 204–205, 234, 243–244, 251–253, 715/255–256, 273, 760
See application file for complete search history.

(56) References Cited

U.S. PATENT DOCUMENTS

| | | | |
|---|---|---|---|
| 5,983,227 A | 11/1999 | Nazem et al. | |
| 6,038,573 A * | 3/2000 | Parks | 715/205 |
| 6,199,082 B1 * | 3/2001 | Ferrel et al. | 715/205 |
| 6,230,173 B1 | 5/2001 | Ferrel et al. | |
| 6,671,854 B1 | 12/2003 | Dunsmoir et al. | |
| 6,771,801 B1 | 8/2004 | Fisher et al. | |
| 6,826,727 B1 * | 11/2004 | Mohr et al. | 715/235 |
| 7,047,033 B2 | 5/2006 | Wyler | |
| 7,051,276 B1 * | 5/2006 | Mogilevsky et al. | 715/209 |
| 7,103,838 B1 | 9/2006 | Krishnamurthy et al. | |
| 7,120,868 B2 * | 10/2006 | Salesin et al. | 715/249 |
| 7,178,101 B2 * | 2/2007 | Tunning | 715/236 |
| 2001/0014899 A1 * | 8/2001 | Fujikawa | 707/513 |

(Continued)

FOREIGN PATENT DOCUMENTS

WO  WO 03/098370 A2 * 11/2003
WO  WO03098370 A2 * 11/2003

OTHER PUBLICATIONS

Liang et al., "Document Layout Structure Extraction Using Bounding Boxes of Different Entities", Proceedings of the 3rd IEEE workshop on applications of computer vision (WACV'96) Dec. 2-4, 1996, pp. 278-283.*

(Continued)

*Primary Examiner*—Laurie Ries
*Assistant Examiner*—Maikhanh Nguyen
(74) *Attorney, Agent, or Firm*—Lee & Hayes, PLLC

(57) ABSTRACT

Techniques relating to structural context for fixed layout markup documents are described. In one instance, a process defines content and associated positional information of a document with a set of content markup. The process also specifies a structural configuration for the document relative to at least some of the content markup, such that the structural configuration is separate from the content markup.

12 Claims, 27 Drawing Sheets

U.S. PATENT DOCUMENTS

| | | | |
|---|---|---|---|
| 2001/0047373 A1 | 11/2001 | Jones et al. | |
| 2003/0229845 A1* | 12/2003 | Salesin et al. | 715/517 |
| 2004/0003097 A1 | 1/2004 | Willis et al. | |
| 2004/0006742 A1* | 1/2004 | Slocombe | 715/513 |
| 2004/0070607 A1* | 4/2004 | Yalovsky et al. | 345/746 |
| 2004/0194035 A1* | 9/2004 | Chakraborty | 715/531 |
| 2004/0239681 A1 | 12/2004 | Robotham et al. | |
| 2005/0203800 A1 | 9/2005 | Sweeney et al. | |
| 2006/0061806 A1 | 3/2006 | King et al. | |
| 2006/0224952 A1* | 10/2006 | Lin | 715/517 |
| 2007/0038643 A1 | 2/2007 | Epstein | |
| 2007/0136659 A1* | 6/2007 | Adelberg et al. | 715/513 |

OTHER PUBLICATIONS

W3C, "Frame-based Layout Via Style Sheets", Jun. 1996, pp. 1-9.*
Chao et al., "Layout and Content Extraction for PDF Documents," DAS2004, Florence, Italy, Sep. 8-10, 2004, pp. 1-12.*
Badros et al., "A Constraint Extension to Scalable Vector Graphics," May 2-5, 2001, pp. 1-10.*
Berleant, "Models for Reader Interaction Systems", CIKM '00:Proceedings of the Ninth International Conference on Information and Knowledge Management, Nov. 2000, pp. 127-133.

* cited by examiner

*XPS Specification and Reference Guide*

Chapter 1. The XPS Document Format

This specification describes a set of conventions for how the XPS Document file format is organized internally and rendered externally. It is built upon the principles described in the Open Packaging Conventions specification and incorporates the requirements and recommendations of that specification, except where indicated otherwise.

The XPS Document format represents a paginated set of related pages with a fixed layout, which are organized as one or more "documents" in the traditional meaning of the word. A file that implements this format includes everything necessary to fully render those documents on a display device or a physical medium (for example, paper). This includes all resources such as fonts or images that might be required to render individual page markings.

In addition, the XPS Document format includes several optional components that build on the minimal set of components required to render a set of pages. This includes the ability to specify print job control instructions, to organize the minimal page markings into larger semantic blocks such as paragraphs, and to physically rearrange the contents of the format for easy consumption in a streaming manner, among others.

Finally, the XPS Document format implements the common package features specified by the Open Packaging Conventions specification to provide support for digital signatures and core properties.

This specification is intended both for producers, who want to emit content in the XPS Document format, and consumers, who want to access and render or process the contents of an XPS Document.

1.1 How This Specification Is Organized

Each chapter in this specification focuses on a different aspect of the XPS Document format.

*Table 1-1. Chapter summary*

| Chapter | Description |
|---|---|
| Parts and Relationships | This chapter describes how the XPS Document makes use of the packaging model (as described in the Open Packaging Conventions specification) to organize its data. All part and relationship types are described in detail, including how they are used and what they can contain.<br><br>This chapter also describes the XPS Document markup model for its parts, as well as how that XML markup relates to the packaging conventions and recommendations it builds on. |
| Documents | The fundamental building blocks of the XPS Document format are described here. This chapter describes how pages are composed into larger documents and how documents are composed into document sequences. These components are represented in XML markup. |
| Graphics | This is the first of several chapters that describes page markings, in particular, vector graphics. The concepts of paths, geometries, and figures are introduced. Vector graphics are represented in XML page-layout markup. |
| Text | This chapter describes how to introduce text page markings in XML page-layout markup. It describes how to reference a font and extract information from that font to render the page. |

| Version 0.75 | Final | 10/11/2005 10:32:00 AM |

© 2005 Microsoft Corporation. All rights reserved. By using or providing feedback on these materials, you agree to the attached license agreement (also available at http://www.microsoft.com/whdc/device/print/metro.mspx).

Fig. 2

```
<FixedPage xmlns="http://schemas.microsoft.com/xps/2005/06" xmlns:x="http://
schemas.microsoft.com/xps/2005/06/resourcedictionary-key" xml:lang="en-us" Width="816"
Height="1056">
 <FixedPage.Resources><ResourceDictionary></ResourceDictionary></
FixedPage.Resources>

<!--System.Windows.Documents.FixedPage-->
  <Path Fill="#FFFFFFFF" Data="F0 M 0, 0 L 816, 0 816, 1056 0, 1056Z" />
  <Canvas Name="Pg1HeaderP1">
   <!--System.Windows.Documents.Glyphs-->
   <Glyphs OriginX="144" OriginY="58.88" FontRenderingEmSize="10.72" FontUri="/
Resources/Fonts/9aa4ea89-755c-4331-be84-0cd43ff87195.ODTTF" UnicodeString="XPS"
Indices=",72;,61" Fill="#FF000000" />
   <!--System.Windows.Documents.Glyphs-->
   <Glyphs OriginX="165.92" OriginY="58.88" FontRenderingEmSize="10.72" FontUri="/
Resources/Fonts/64326a24-1829-4393-8602-67e5b520db43.ODTTF" UnicodeString=" "
Fill="#FF000000" />
   <!--System.Windows.Documents.Glyphs-->
   <Glyphs OriginX="169.92" OriginY="58.88" FontRenderingEmSize="10.72" FontUri="/
Resources/Fonts/9aa4ea89-755c-4331-be84-0cd43ff87195.ODTTF"
UnicodeString="Specification and Reference Guide"
Indices=",70;,64;,63;,55;,29;,38;,29;,55;,63;,41;,29;,64;,64;,39;,61;,66;,64;,37;,72;,61;,39;,61;,45;
,61;,66;,55;,61;,38;,80;,66;,28;,66" Fill="#FF000000" />
   <!--System.Windows.Documents.Glyphs-->
   <Glyphs OriginX="361.92" OriginY="58.88" FontRenderingEmSize="10.72" FontUri="/
Resources/Fonts/64326a24-1829-4393-8602-67e5b520db43.ODTTF" UnicodeString=" 1 "
Indices=",2893;,380;,67" Fill="#FF000000" />
  </Canvas>
```

```
<!--System.Windows.Documents.Glyphs-->
                                    ─602
<Glyphs Name="Pg1FooterP1" OriginX="144" OriginY="972" FontRenderingEmSize="10.72"
FontUri="/Resources/Fonts/64326a24-1829-4393-8602-67e5b520db43.ODTTF"
UnicodeString="Version 0.75 Final 10/11/2005 10:28:00 AM "
Indices=";;,42;;;;;,34;;;,63;,63;,1937;;;;;;,1280;;;,43;;;,43;;,63;;,63;,34;;;;,63;;;,62;,63"
Fill="#FF999999" />
```

Fig. 6

```
<!--System.Windows.Documents.Glyphs-->                              306
<Canvas Name="Pg1FooterP2">    702
   <Glyphs OriginX="144" OriginY="990.88" FontRenderingEmSize="10.72" FontUri="/
Resources/Fonts/64326a24-1829-4393-8602-67e5b520db43.ODTTF" UnicodeString="© 2005
Microsoft Corporation. All rights reserved. By using or providing feedback on these materials,
you agree "
Indices=",97;,31;,62;,59;,60;,61;,33;,81;,22;,49;,39;,58;,48;,58;,33;,34;,33;,66;,57;,40;,58;,58;,41;
,56;,36;,23;,58;,59;,33;,32;,65;,24;,24;,33;,40;,23;,59;,60;,36;,49;,31;,41;,55;,49;,55;,41;,55;,57;,5
9;,32;,33;,64;,56;,33;,58;,50;,24;,59;,60;,31;,57;,40;,32;,59;,39;,58;,57;,23;,59;,24;,60;,58;,33;,31;
,57;,55;,60;,60;,56;,48;,55;,33;,58;,58;,33;,36;,60;,57;,47;,57;,31;,94;,56;,35;,57;,40;,24;,57;,24;,4
9;,33;,31;,57;,58;,59;,32;,56;,59;,39;,57;,55" Fill="#FF999999" />
   <!--System.Windows.Shapes.Path-->
   <Path Fill="#FF999999" Data="F1 M 136.16, 978.08 L 136.8, 978.08 136.8, 978.72 136.16,
978.72Z" />
   <!--System.Windows.Shapes.Path-->
   <Path Fill="#FF999999" Data="F1 M 136.16, 978.08 L 136.8, 978.08 136.8, 978.72 136.16,
978.72Z" />
   <!--System.Windows.Shapes.Path-->
   <Path Fill="#FF999999" Data="F1 M 136.8, 978.08 L 727.2, 978.08 727.2, 978.72 136.8,
978.72Z" />
   <!--System.Windows.Shapes.Path-->
   <Path Fill="#FF999999" Data="F1 M 727.2, 978.08 L 727.84, 978.08 727.84, 978.72 727.2,
978.72Z" />
   <!--System.Windows.Shapes.Path-->
   <Path Fill="#FF999999" Data="F1 M 727.2, 978.08 L 727.84, 978.08 727.84, 978.72 727.2,
978.72Z" />
   <!--System.Windows.Shapes.Path-->
   <Path Fill="#FF999999" Data="F1 M 136.16, 978.72 L 136.8, 978.72 136.8, 992.96 136.16,
992.96Z" />
   <!--System.Windows.Shapes.Path-->
   <Path Fill="#FF999999" Data="F1 M 727.2, 978.72 L 727.84, 978.72 727.84, 992.96 727.2,
992.96Z" />
   <!--System.Windows.Documents.Glyphs-->
   <Glyphs OriginX="144" OriginY="1003.84" FontRenderingEmSize="10.72" FontUri="/
Resources/Fonts/64326a24-1829-4393-8602-67e5b520db43.ODTTF" UnicodeString="to the
attached license agreement (also available at http://www.microsoft.com/whdc/device/print/
metro.mspx)."
Indices=",36;,58;,33;,36;,59;,56;,32;,57;,36;,36;,57;,49;,59;,56;,59;,33;,24;,24;,48;,56;,60;,49;,56;
,32;,57;,58;,41;,55;,57;,94;,55;,60;,35;,33;,42;,57;,24;,49;,57;,32;,57;,57;,57;,23;,24;,57;,60;,22;,5
7;,33;,56;,35;,33;,59;,36;,36;,60;,41;,42;,42;,79;,78;,77;,33;,94;,24;,49;,41;,56;,50;,56;,33;,36;,33;
,48;,58;,94;,42;,79;,58;,60;,49;,42;,58;,57;,56;,24;,48;,57;,41;,59;,40;,22;,60;,36;,42;,94;,56;,36;,4
1;,58;,33;,92;,49;,59;,56;,42" Fill="#FF999999" />
```

```
<!--System.Windows.Documents.Glyphs-->
<Glyphs OriginX="713.44" OriginY="1003.84" FontRenderingEmSize="16" FontUri="/
Resources/Fonts/64326a24-1829-4393-8602-67e5b520db43.ODTTF" UnicodeString=" "
Fill="#FF999999" />
<!--System.Windows.Documents.Glyphs-->
<Glyphs OriginX="718.72" OriginY="1003.84" FontRenderingEmSize="16" FontUri="/
Resources/Fonts/3b85141b-0969-4d9e-b9c8-e705bb7e6543.ODTTF" UnicodeString=" "
Fill="#FF999999" />
<!--System.Windows.Shapes.Path-->
<Path Fill="#FF999999" Data="F1 M 136.16, 1007.36 L 136.8, 1007.36 136.8, 1008 136.16,
1008Z" />
<!--System.Windows.Shapes.Path-->
<Path Fill="#FF999999" Data="F1 M 136.16, 1007.36 L 136.8, 1007.36 136.8, 1008 136.16,
1008Z" />
<!--System.Windows.Shapes.Path-->
<Path Fill="#FF999999" Data="F1 M 136.8, 1007.36 L 727.2, 1007.36 727.2, 1008 136.8,
1008Z" />
<!--System.Windows.Shapes.Path-->
<Path Fill="#FF999999" Data="F1 M 727.2, 1007.36 L 727.84, 1007.36 727.84, 1008 727.2,
1008Z" />
<!--System.Windows.Shapes.Path-->
<Path Fill="#FF999999" Data="F1 M 727.2, 1007.36 L 727.84, 1007.36 727.84, 1008 727.2,
1008Z" />
<!--System.Windows.Shapes.Path-->
<Path Fill="#FF999999" Data="F1 M 136.16, 992.96 L 136.8, 992.96 136.8, 1007.36 136.16,
1007.36Z" />
<!--System.Windows.Shapes.Path-->
<Path Fill="#FF999999" Data="F1 M 727.2, 992.96 L 727.84, 992.96 727.84, 1007.36 727.2,
1007.36Z" />
</Canvas>
```

Fig. 8

```
<!--System.Windows.Documents.Glyphs-->           908        906
<Glyphs Name="G1" OriginX="144" OriginY="149.44" FontRenderingEmSize="21.28"
FontUri="/Resources/Fonts/33c063c8-1259-4322-acc8-8fc1964cc064.ODTTF"
UnicodeString="Chapter 1." Indices=";;;;;,51" Fill="#FF000000" />                          902
  <!--System.Windows.Documents.Glyphs-->         904      918
<Glyphs Name="G2" OriginX="268.48" OriginY="149.44"  916                                   912
FontRenderingEmSize="21.28" FontUri="/Resources/Fonts/3f87ce81-fb61-4ea7-8d62-
aed569d1b895.ODTTF" UnicodeString=" " Fill="#FF000000" />
  <!--System.Windows.Documents.Glyphs-->         914    928    926
<Glyphs Name="G3" OriginX="288" OriginY="149.44" FontRenderingEmSize="21.28"
FontUri="/Resources/Fonts/33c063c8-1259-4322-acc8-8fc1964cc064.ODTTF"
UnicodeString="The XPS Document Format " Indices=";;;;;,72;;;;,60;;;;;;;;;;;;,68"         922
Fill="#FF000000" />                                      924
  <!--System.Windows.Documents.Glyphs-->                         934
<Glyphs Name="G4" OriginX="144" OriginY="190.72" FontRenderingEmSize="10.72"
FontUri="/Resources/Fonts/64326a24-1829-4393-8602-67e5b520db43.ODTTF"
UnicodeString="This specification describes a set of conventions for how the XPS      930
Document file format is organized "             932
Indices=";;;;;;,58;;;;;;;;;;;;;;,51;;;;,58;;;,58;;;;;,60;;,34;;;,62;;;;;;;;;;;,59;,42;;;;,80;;;;,58;;;;,67;
;,76;;;;;;;;;,34;;;;;;,34;;,60;;;;;;;,51;;;,42" Fill="#FF000000" />
  <!--System.Windows.Documents.Glyphs-->                         938
<Glyphs Name="G5" OriginX="144" OriginY="205.76" FontRenderingEmSize="10.72"
FontUri="/Resources/Fonts/64326a24-1829-4393-8602-67e5b520db43.ODTTF"
UnicodeString="internally and rendered externally. It is built upon the principles     936
described in the Open Packaging "             940
Indices=";;;;;;;;;;;;;,34;;;;,61;;;,58;;,34;;;;,58;,42;;;;;;;;,43;;;;,51;;;;;;;;;,61;;;;;;;,34;;;;;,51;;;;;;;
61;;;,51;;;;,59;;;;;;;;,58;;,78;;;;;;,59" Fill="#FF000000" />
  <!--System.Windows.Documents.Glyphs-->                         944
<Glyphs Name="G6" OriginX="144" OriginY="220.8" FontRenderingEmSize="10.72"
FontUri="/Resources/Fonts/64326a24-1829-4393-8602-67e5b520db43.ODTTF"
UnicodeString="Conventions specification and incorporates the requirements and      942
recommendations of that specification, "        946
Indices=";;;,58;;;;;;;;;,51;;;;,25;;;;;;;;;;;;;;,34;;;;,61;;;;;,59;;;;;,58;;;,59;;;;;,95;;;;;;;;;;,34;;;,51;;;,
95;;;;;;;;;;,34;;,34;;;;;;;;,61" Fill="#FF000000" />
  <!--System.Windows.Documents.Glyphs-->                         950
<Glyphs Name="G7" OriginX="144" OriginY="235.68" FontRenderingEmSize="10.72"
FontUri="/Resources/Fonts/64326a24-1829-4393-8602-67e5b520db43.ODTTF"
UnicodeString="except where indicated otherwise. "         952
Indices=";;;,58;;;;;;;,59;;;;;;;;;;;,61;;;;;;;,42" Fill="#FF000000" />                     948
```

```
<!--System.Windows.Documents.Glyphs-->
<Glyphs Name="G8" OriginX="144" OriginY="262.72" FontRenderingEmSize="10.72"
FontUri="/Resources/Fonts/64326a24-1829-4393-8602-67e5b520db43.ODTTF"
UnicodeString="The XPS Document format represents a paginated set of related pages with a
fixed layout, which are "
Indices=";;;;;;,67;,.76;;;;;;;;;,34;;;;;;,34;;,59;,61;;;;;;;,51;;;,34;;;;;;;;;,61;;;;;,60;;;;,25;;;;;;,59;;,51;;;;;;
,58;;;,25;;;;;;,58;;;;;;;;;;;,41" Fill="#FF000000" />
 <!--System.Windows.Documents.Glyphs-->
<Glyphs Name="G9" OriginX="144" OriginY="277.76" FontRenderingEmSize="10.72"
FontUri="/Resources/Fonts/64326a24-1829-4393-8602-67e5b520db43.ODTTF"
UnicodeString="organized as one or more "documents" in the traditional meaning of the word. A
file that implements this "
Indices=";,42;;;;;;;;;,59;;,34;;;;,34;;,42;;,95;;;,58;;,45;;,60;;;;;;;;;;;,59;;;;;;;;;;;;,95;,58;;;;;;,34;;;;;,
60;;;,34;;,67;;;;;;;;;;,25" Fill="#FF000000" />
 <!--System.Windows.Documents.Glyphs-->
<Glyphs Name="G10" OriginX="144" OriginY="292.8" FontRenderingEmSize="10.72"
FontUri="/Resources/Fonts/64326a24-1829-4393-8602-67e5b520db43.ODTTF"
UnicodeString="format includes everything necessary to fully render those documents on a
display device or a physical "
Indices=";,60;;;;;;;;;;;;,51;;,59;;,59;;;;;;;;;,58;;;;;,59;;,58;;;,59;;;;;;;;,61;;,42;;;;,51;;,34;,61;;;;;;;,34
;;;;,58;;;;,50;;;;;;;,58;;;,42" Fill="#FF000000" />
 <!--System.Windows.Documents.Glyphs-->
<Glyphs Name="G11" OriginX="144" OriginY="307.68" FontRenderingEmSize="10.72"
FontUri="/Resources/Fonts/64326a24-1829-4393-8602-67e5b520db43.ODTTF"
UnicodeString="medium (for example, paper). This includes all resources such as fonts or
images that might be required "
Indices=";;;;;;;;,34;;,42;;,58;;;;;;,34;;;,59;;;;,34;;;;;;;;;;;;,51;;;;;;,58;;,61;;;,51;;,61;;;;;,34;,34;;;;;,
60;,42;;;;;;,51;;;;;;;,25;;;;,58;;,42;;;;;,58;,61" Fill="#FF000000" />
 <!--System.Windows.Documents.Glyphs-->
<Glyphs Name="G12" OriginX="144" OriginY="322.72" FontRenderingEmSize="10.72"
FontUri="/Resources/Fonts/64326a24-1829-4393-8602-67e5b520db43.ODTTF"
UnicodeString="to render individual page markings. "
Indices=";;;,42;;;;,58;;;;;;,26;;;;;;;;;,58;;;;;;,42" Fill="#FF000000" />
```

```
<!--System.Windows.Documents.Glyphs-->
<Glyphs Name="G13" OriginX="144" OriginY="349.76" FontRenderingEmSize="10.72"
FontUri="/Resources/Fonts/64326a24-1829-4393-8602-67e5b520db43.ODTTF"
UnicodeString="In addition, the XPS Document format includes several optional components
that build on the minimal set "
Indices=",43;;;,58;;;;;;;;;;;;,34;,;;,34;,76;,;;;;,61;;;;,60;;;;;;;;;;;;,58;;;,50;;,58;;;;,34;;;;,59;;;;;;;,61;;;;;;
;;;;;,34;;;;;;;;,61" Fill="#FF000000" />
  <!--System.Windows.Documents.Glyphs-->
  <Glyphs Name="G14" OriginX="144" OriginY="364.8" FontRenderingEmSize="10.72"
FontUri="/Resources/Fonts/64326a24-1829-4393-8602-67e5b520db43.ODTTF"
UnicodeString="of components required to render a set of pages. This includes the ability to
specify print job control "
Indices=";;;;,59;;,61;;;;;;;,34;;;;;;,42;;,61;;;,59;;;;,61;;;,42;;;,34;;;;,34;;,34;;;;,58;;;;,35;;;;;;;;;;;,61;;;;;;;;,
58;;;;;;;;;,60;;;,61;;;;,34;;,34;;;;;;;,32;;,61;;;;;;,42" Fill="#FF000000" />
  <!--System.Windows.Documents.Glyphs-->
  <Glyphs Name="G15" OriginX="144" OriginY="379.68" FontRenderingEmSize="10.72"
FontUri="/Resources/Fonts/64326a24-1829-4393-8602-67e5b520db43.ODTTF"
UnicodeString="instructions, to organize the minimal page markings into larger semantic blocks
such as paragraphs, and "
Indices=";;;;;;;;;;;;;;;,42;;;;;;;;;;,58;,34;;;;;;;;;;;;,34;;;;,42;;;;;;;;;;,60;;;;;;,58;;,34;;;;;;;;;;;;,51;;;,34;;;;;;;,
50;;;;;;,61;;;;;;;,34" Fill="#FF000000" />
  <!--System.Windows.Documents.Glyphs-->
  <Glyphs Name="G16" OriginX="144" OriginY="394.72" FontRenderingEmSize="10.72"
FontUri="/Resources/Fonts/64326a24-1829-4393-8602-67e5b520db43.ODTTF"
UnicodeString="to physically rearrange the contents of the format for easy consumption in a
streaming manner, among "
Indices=";;;;,61;;;;;;;;;;,34;;;,58;;;;;;;;;;;,58;;;,60;;;;;;;;;;;;;;,34;;;,60;;;;;;;,59;;;,34;;;;,51;;,34;;;;;;;;;;,61;;;;;;
,37;;;;;;;;;,96;;;;;;;;;;;;,61" Fill="#FF000000" />
  <!--System.Windows.Documents.Glyphs-->
  <Glyphs Name="G17" OriginX="144" OriginY="409.76" FontRenderingEmSize="10.72"
FontUri="/Resources/Fonts/64326a24-1829-4393-8602-67e5b520db43.ODTTF"
UnicodeString="others. " Fill="#FF000000" />
  <!--System.Windows.Documents.Glyphs-->
  <Glyphs Name="G18" OriginX="144" OriginY="436.8" FontRenderingEmSize="10.72"
FontUri="/Resources/Fonts/64326a24-1829-4393-8602-67e5b520db43.ODTTF"
UnicodeString="Finally, the XPS Document format implements the common package features
specified by the Open "
Indices=";;;;;;;;;;;;;;;;;,67;,34;;;;;;,96;;;;;,34;;;,42;;;;;;;;;;;;;;;;;,58;;;,51;;;,96;;;,34;;;;;;,58;;;,34;;;;;;;,42;;;,34;;
;,58;;;;;;;,61;;;,61;,58;,34" Fill="#FF000000" />
```

```
<!--System.Windows.Documents.Glyphs-->
<Glyphs Name="G19" OriginX="144" OriginY="451.68" FontRenderingEmSize="10.72"
FontUri="/Resources/Fonts/64326a24-1829-4393-8602-67e5b520db43.ODTTF"
UnicodeString="Packaging Conventions specification to provide support for digital signatures
and core properties. "
Indices=";;;;;;;,61;;;;,61;;;;;;;,51;;;,61;;;;,25;;;;;;;;;;,34;;,42;;;,26;;;;;;,61;,60;;;;,34;;,41;;;;;;;;;;;;;;
50;;;;;;,60;;,58;;,61;,42;;;,58" Fill="#FF000000" />
<!--System.Windows.Documents.Glyphs-->
<Glyphs Name="G20" OriginX="144" OriginY="478.72" FontRenderingEmSize="10.72"
FontUri="/Resources/Fonts/64326a24-1829-4393-8602-67e5b520db43.ODTTF"
UnicodeString="This specification is intended both for producers, who want to emit content in
the XPS Document format, "
Indices=";;;;;;,58;;;;;;;;;;;;,51;;;;;;;;,61;,34;;;;,34;;,59;;,34;;,41;;;,51;;;,34;;;,61;;,34;;;;;;;;;;,34;;;;
;;;;;;;,34;;;,67;;,76;,60;;;;;;;;,34" Fill="#FF000000" />
<!--System.Windows.Documents.Glyphs-->
<Glyphs Name="G21" OriginX="144" OriginY="493.76" FontRenderingEmSize="10.72"
FontUri="/Resources/Fonts/64326a24-1829-4393-8602-67e5b520db43.ODTTF"
UnicodeString="and consumers, who want to access and render or process the contents of an
XPS Document. "
Indices=";;;;,51;;;;;;;,42;;;;;,61;;;;;;;;;,59;;;;;;,50;;;;,61;;;;,61;;,58;;,34;;,41;;,61;;,59;;;;,50;;;;;;;;;;;;,34
;;;;;,34;;;;;,76;;;;,95" Fill="#FF000000" />
<!--System.Windows.Documents.Glyphs-->
<Glyphs Name="G22" OriginX="144" OriginY="544.64" FontRenderingEmSize="16" FontUri="/
Resources/Fonts/33c063c8-1259-4322-acc8-8fc1964cc064.ODTTF" UnicodeString="1.1"
Fill="#FF000000" />
<!--System.Windows.Documents.Glyphs-->
<Glyphs Name="G23" OriginX="172.48" OriginY="544.64" FontRenderingEmSize="16"
FontUri="/Resources/Fonts/3f87ce81-fb61-4ea7-8d62-aed569d1b895.ODTTF" UnicodeString="
" Fill="#FF000000" />
<!--System.Windows.Documents.Glyphs-->
<Glyphs Name="G24" OriginX="192" OriginY="544.64" FontRenderingEmSize="16" FontUri="/
Resources/Fonts/33c063c8-1259-4322-acc8-8fc1964cc064.ODTTF" UnicodeString="How This
Specification Is Organized " Indices=";;;;;;;;;;;;;;;;;,60" Fill="#FF000000" />
```

```
<!--System.Windows.Shapes.Path-->
<Path Fill="#FF000000" Data="F1 M 142.08, 520 L 721.92, 520 721.92, 520.64 142.08, 520.64Z" />
<!--System.Windows.Documents.Glyphs-->
<Glyphs Name="G25" OriginX="144" OriginY="572.8" FontRenderingEmSize="10.72" FontUri="/Resources/Fonts/64326a24-1829-4393-8602-67e5b520db43.ODTTF" UnicodeString="Each chapter in this specification focuses on a different aspect of the XPS Document format. "
Indices=";;;;;;;;;;,42;;;;;;;;;;,51;;;,25;;;;;;;;;,34;;;,50;;;;;;,58;;;,25;;;,58;;;;;,58;;;,58;;;;,59;;;;,58;;;;,67;;,76;;;;;;;;,34;;;;,58" Fill="#FF000000" />

<!--System.Windows.Documents.Glyphs-->
<Glyphs Name="G26" OriginX="144" OriginY="601.92" FontRenderingEmSize="10.72" FontUri="/Resources/Fonts/9aa4ea89-755c-4331-be84-0cd43ff87195.ODTTF" UnicodeString="Table 1-1. Chapter summary " Indices=";;;;;,63;,62;;;;;;,58;;;,42;;;;;;,58" Fill="#FF000000" />

<!--System.Windows.Documents.Glyphs-->
<Glyphs Name="G27" OriginX="146.88" OriginY="623.2" FontRenderingEmSize="10.72" FontUri="/Resources/Fonts/33c063c8-1259-4322-acc8-8fc1964cc064.ODTTF" UnicodeString="Chapter" Indices=";;;,69;;;" Fill="#FF000000" />
<Glyphs Name="G28" OriginX="256" OriginY="623.2" FontRenderingEmSize="10.72" FontUri="/Resources/Fonts/33c063c8-1259-4322-acc8-8fc1964cc064.ODTTF" UnicodeString="Description" Indices=";;;;;;;,68;;;,67" Fill="#FF000000" />

<!--System.Windows.Shapes.Path-->
<Path Fill="#FF000000" Data="F1 M 143.04, 608 L 251.52, 608 251.52, 608.32 143.04, 608.32Z" />
<!--System.Windows.Shapes.Path-->
<Path Fill="#FF000000" Data="F1 M 251.52, 608 L 251.84, 608 251.84, 608.32 251.52, 608.32Z" />
<!--System.Windows.Shapes.Path-->
<Path Fill="#FF000000" Data="F1 M 251.84, 608 L 723.36, 608 723.36, 608.32 251.84, 608.32Z" />
```

```
<!--System.Windows.Documents.Glyphs-->
<Glyphs Name="G29" OriginX="146.88" OriginY="644.32" FontRenderingEmSize="10.72"
FontUri="/Resources/Fonts/64326a24-1829-4393-8602-67e5b520db43.ODTTF"
UnicodeString="Parts and " Indices=";;;;;;;;,61" Fill="#FF000000" />
  <!--System.Windows.Documents.Glyphs-->
  <Glyphs Name="G30" OriginX="146.88" OriginY="659.36" FontRenderingEmSize="10.72"
FontUri="/Resources/Fonts/64326a24-1829-4393-8602-67e5b520db43.ODTTF"
UnicodeString="Relationships " Fill="#FF000000" />

<!--System.Windows.Documents.Glyphs-->
  <Glyphs Name="G31" OriginX="256" OriginY="644.32" FontRenderingEmSize="10.72"
FontUri="/Resources/Fonts/64326a24-1829-4393-8602-67e5b520db43.ODTTF"
UnicodeString="This chapter describes how the XPS Document makes use of the packaging
model (as "
Indices=";;;;;;;;;;;,41;;,61;;;,51;;;;,50;;;,60;;;;,62;;;;;;,34;;;;;,95;;;;;;;,58;;;;,61;;;,34;,60;;;;,58;;;;,50;;;;
;,61;;;,60;;;;;;,51" Fill="#FF000000" />
  <!--System.Windows.Documents.Glyphs--> 1406  /—1404
  <Glyphs Name="G32" OriginX="256" OriginY="659.36" FontRenderingEmSize="10.72"
FontUri="/Resources/Fonts/64326a24-1829-4393-8602-67e5b520db43.ODTTF"
UnicodeString="described in the Open Packaging Conventions specification) to organize its
data. All "                                            ~—1408
Indices=";;;,50;;;;,58;;;;;;;;,58;;,77;;;;;;;,50;;;;,25;;;;,69;;;;;;;;;;,51;;,51;;;;;;;;;;;;;,34;;;;,60;;;;;;;,59;;;;;;;;
;;,34" Fill="#FF000000" />
  <!--System.Windows.Documents.Glyphs-->
  <Glyphs Name="G33" OriginX="256" OriginY="674.24" FontRenderingEmSize="10.72"
FontUri="/Resources/Fonts/64326a24-1829-4393-8602-67e5b520db43.ODTTF"
UnicodeString="part and relationship types are described in detail, including how they are used
and "
Indices=";;;;;;;,61;,34;;;;;;;;;;;;;;;;;,51;;;,42;;;,61;;;,50;;;;,59;;;;,34;;;;;;;;;;;;;;;;;;,81;;;;,58;;;,42;;;;,51;
;,61" Fill="#FF000000" />
  <!--System.Windows.Documents.Glyphs-->
  <Glyphs Name="G34" OriginX="256" OriginY="689.28" FontRenderingEmSize="10.72"
FontUri="/Resources/Fonts/64326a24-1829-4393-8602-67e5b520db43.ODTTF"
UnicodeString="what they can contain. " Indices=";;;;;;;;;,34;;;;;,51" Fill="#FF000000" />
```

```
<!--System.Windows.Documents.Glyphs-->
<Glyphs Name="G35" OriginX="256" OriginY="708.32" FontRenderingEmSize="10.72"
FontUri="/Resources/Fonts/64326a24-1829-4393-8602-67e5b520db43.ODTTF"
UnicodeString="This chapter also describes the XPS Document markup model for its parts, as
well as "
Indices=";;;;;;;;;;;,41;;;;;,60;;,61;;;,50;;;;,51;;;,62;;;;;;,34;;;;;,95;;;;;;,42;;;,61;;;,60;,61;;;;;;,42;;;;;;,58;
;;;;;,51;;,81;;;;;,51" Fill="#FF000000" />
<!--System.Windows.Documents.Glyphs-->
<Glyphs Name="G36" OriginX="256" OriginY="723.36" FontRenderingEmSize="10.72"
FontUri="/Resources/Fonts/64326a24-1829-4393-8602-67e5b520db43.ODTTF"
UnicodeString="how that XML markup relates to the packaging conventions and
recommendations it "
Indices=";;;;;;;;;;;,54;;;;,42;;;,61;;,42;;;;;;,34;;;;;;;;;;;,58;;;;;;;,61;;;;;;;;,34;;;;,42;;;,60;;;;;;;;;;,51"
Fill="#FF000000" />
<!--System.Windows.Documents.Glyphs-->
<Glyphs Name="G37" OriginX="256" OriginY="738.24" FontRenderingEmSize="10.72"
FontUri="/Resources/Fonts/64326a24-1829-4393-8602-67e5b520db43.ODTTF"
UnicodeString="builds on. " Fill="#FF000000" />

<!--System.Windows.Shapes.Path-->
<Path Fill="#FF000000" Data="F1 M 143.04, 630.24 L 251.52, 630.24 251.52, 630.56 143.04,
630.56Z" />
<!--System.Windows.Shapes.Path-->
<Path Fill="#FF000000" Data="F1 M 251.52, 630.24 L 251.84, 630.24 251.84, 630.56 251.52,
630.56Z" />
<!--System.Windows.Shapes.Path-->
<Path Fill="#FF000000" Data="F1 M 251.84, 630.24 L 723.36, 630.24 723.36, 630.56 251.84,
630.56Z" />

<!--System.Windows.Documents.Glyphs-->
<Glyphs Name="G38" OriginX="146.88" OriginY="759.52" FontRenderingEmSize="10.72"
FontUri="/Resources/Fonts/64326a24-1829-4393-8602-67e5b520db43.ODTTF"
UnicodeString="Documents " Indices=";;;;,95" Fill="#FF000000" />
<!--System.Windows.Documents.Glyphs-->
<Glyphs Name="G39" OriginX="146.88" OriginY="778.56" FontRenderingEmSize="10.72"
FontUri="/Resources/Fonts/64326a24-1829-4393-8602-67e5b520db43.ODTTF"
UnicodeString=" " Fill="#FF000000" />
```

```
<!--System.Windows.Documents.Glyphs-->
<Glyphs Name="G40" OriginX="256" OriginY="759.52" FontRenderingEmSize="10.72"
FontUri="/Resources/Fonts/64326a24-1829-4393-8602-67e5b520db43.ODTTF"
UnicodeString="The fundamental building blocks of the XPS Document format are described
here. "
Indices=";;;;;;;;;;,96;;;;;;;;;;;;;;;;,25;;,51;;;,34;;;;;;;;,34;;;;;;;;;;;;;,34;;,60;;,96;;;;;;;,58;;;,58;;;;,25;;;,61;;;,5
8" Fill="#FF000000" />
  <!--System.Windows.Documents.Glyphs-->
  <Glyphs Name="G41" OriginX="256" OriginY="774.56" FontRenderingEmSize="10.72"
FontUri="/Resources/Fonts/64326a24-1829-4393-8602-67e5b520db43.ODTTF"
UnicodeString="This chapter describes how pages are composed into larger documents and
how "
Indices=";;;;;;;;;;;;,41;;,61;;;,51;;;;;,50;;;,60;;,34;;,58;;;,51;;;;,58;;,51;;;,61;;;,59;;;;;,59;;;;;,61;;,42;,34;
;;;;,95;;;;;;;;,61;;;;,80" Fill="#FF000000" />
  <!--System.Windows.Documents.Glyphs-->
  <Glyphs Name="G42" OriginX="256" OriginY="789.44" FontRenderingEmSize="10.72"
FontUri="/Resources/Fonts/64326a24-1829-4393-8602-67e5b520db43.ODTTF"
UnicodeString="documents are composed into document sequences. These components are "
Indices=";;;;,95;;;;;;;,42;;;,50;;,95;;;,51;;;;;;;;,59;;,61;;;;;;;;;;,50;;;;;;,51;;;;;;;;,50;;;;;;,61;;;;;;;;,59;;,58"
Fill="#FF000000" />
  <!--System.Windows.Documents.Glyphs-->
  <Glyphs Name="G43" OriginX="256" OriginY="804.48" FontRenderingEmSize="10.72"
FontUri="/Resources/Fonts/64326a24-1829-4393-8602-67e5b520db43.ODTTF"
UnicodeString="represented in XML markup. " Indices=";;,61;;;,51;;;;,61;;;;;;;;;;,59;;;,61"
Fill="#FF000000" />

<!--System.Windows.Shapes.Path-->
  <Path Fill="#FF000000" Data="F1 M 143.04, 745.44 L 251.52, 745.44 251.52, 745.76 143.04,
745.76Z" />
  <!--System.Windows.Shapes.Path-->
  <Path Fill="#FF000000" Data="F1 M 251.52, 745.44 L 251.84, 745.44 251.84, 745.76 251.52,
745.76Z" />
  <!--System.Windows.Shapes.Path-->
  <Path Fill="#FF000000" Data="F1 M 251.84, 745.44 L 723.36, 745.44 723.36, 745.76 251.84,
745.76Z" />
```

```
<!--System.Windows.Documents.Glyphs-->
  <Glyphs Name="G44" OriginX="146.88" OriginY="825.76" FontRenderingEmSize="10.72"
FontUri="/Resources/Fonts/64326a24-1829-4393-8602-67e5b520db43.ODTTF"
UnicodeString="Graphics " Fill="#FF000000" />
  <!--System.Windows.Documents.Glyphs-->
  <Glyphs Name="G45" OriginX="146.88" OriginY="844.64" FontRenderingEmSize="10.72"
FontUri="/Resources/Fonts/64326a24-1829-4393-8602-67e5b520db43.ODTTF"
UnicodeString=" " Fill="#FF000000" />

<!--System.Windows.Documents.Glyphs-->
  <Glyphs Name="G46" OriginX="256" OriginY="825.76" FontRenderingEmSize="10.72"
FontUri="/Resources/Fonts/64326a24-1829-4393-8602-67e5b520db43.ODTTF"
UnicodeString="This is the first of several chapters that describes page markings, in particular,
vector "
Indices=";;;;;;;;;;;,34;;;;,38;;,59;;;,51;;;;;;;,34;;;;;;;;,50;;;;;;;,58;;;;,25;;;,51;;;,58;;;;;,42;;;;;;;;;;;;;;;;;;,
34;;;;,37;;,42" Fill="#FF000000" />
  <!--System.Windows.Documents.Glyphs-->
  <Glyphs Name="G47" OriginX="256" OriginY="840.64" FontRenderingEmSize="10.72"
FontUri="/Resources/Fonts/64326a24-1829-4393-8602-67e5b520db43.ODTTF"
UnicodeString="graphics. The concepts of paths, geometries, and figures are introduced. Vector
"
Indices=";;;;;;;;;,35;;;;,34;;;;;,58;;;,50;;,60;;,34;;;;;;;;;,59;;;;;;,59;;;;;,61;;;;;,62;;;,51;;;,42;;;;;;,59;;;;;,
35;;;,58;;;,60" Fill="#FF000000" />
  <!--System.Windows.Documents.Glyphs-->
  <Glyphs Name="G48" OriginX="256" OriginY="855.68" FontRenderingEmSize="10.72"
FontUri="/Resources/Fonts/64326a24-1829-4393-8602-67e5b520db43.ODTTF"
UnicodeString="graphics are represented in XML page-layout markup. "
Indices=";;;;;;;,51;;,58;;;,34;;,58;;;,58;;;;;,61;;;;,68;;;;;;;;;;;;;;,58" Fill="#FF000000" />

<!--System.Windows.Shapes.Path-->
  <Path Fill="#FF000000" Data="F1 M 143.04, 811.68 L 251.52, 811.68 251.52, 812 143.04,
812Z" />
  <!--System.Windows.Shapes.Path-->
  <Path Fill="#FF000000" Data="F1 M 251.52, 811.68 L 251.84, 811.68 251.84, 812 251.52,
812Z" />
  <!--System.Windows.Shapes.Path-->
  <Path Fill="#FF000000" Data="F1 M 251.84, 811.68 L 723.36, 811.68 723.36, 812 251.84,
812Z" />
```

```
<!--System.Windows.Documents.Glyphs-->
<Glyphs Name="G49" OriginX="146.88" OriginY="876.96" FontRenderingEmSize="10.72"
FontUri="/Resources/Fonts/64326a24-1829-4393-8602-67e5b520db43.ODTTF"
UnicodeString="Text " Fill="#FF000000" />
  <!--System.Windows.Documents.Glyphs-->
  <Glyphs Name="G50" OriginX="146.88" OriginY="895.84" FontRenderingEmSize="10.72"
FontUri="/Resources/Fonts/64326a24-1829-4393-8602-67e5b520db43.ODTTF"
UnicodeString=" " Fill="#FF000000" />

<!--System.Windows.Documents.Glyphs-->
  <Glyphs Name="G51" OriginX="256" OriginY="876.96" FontRenderingEmSize="10.72"
FontUri="/Resources/Fonts/64326a24-1829-4393-8602-67e5b520db43.ODTTF"
UnicodeString="This chapter describes how to introduce text page markings in XML page-layout
"
Indices=";;;;;;;;;;,41;;,61;;;,51;;;;;,50;;;,60;;;,37;,60;;;;;;;;;,50;;;;,58;;;;;;,58;;;;,41;;;;;,51;;;;;;;,34;;;;;;;
,58" Fill="#FF000000" />
  <!--System.Windows.Documents.Glyphs-->
  <Glyphs Name="G52" OriginX="256" OriginY="891.84" FontRenderingEmSize="10.72"
FontUri="/Resources/Fonts/64326a24-1829-4393-8602-67e5b520db43.ODTTF"
UnicodeString="markup. It describes how to reference a font and extract information from that
font "
Indices=";;;;;,34;;,43;;;,61;;;,51;;;;,59;;;;,60;;;,37;;;,42;;;,58;;;;;,58;;;,34;;;;,37;;;;;,34;;;;;,58;;;;;;,34;;;
;;;,61;;,34;;;,95;;;;;;,34" Fill="#FF000000" />
  <!--System.Windows.Documents.Glyphs-->
  <Glyphs Name="G53" OriginX="256" OriginY="906.88" FontRenderingEmSize="10.72"
FontUri="/Resources/Fonts/64326a24-1829-4393-8602-67e5b520db43.ODTTF"
UnicodeString="to render the page. " Indices=";;;,42;;;;,58;;;;;,59;;;,58" Fill="#FF000000" />
```

```
<!--System.Windows.Shapes.Path-->
<Path Fill="#FF000000" Data="F1 M 143.04, 862.88 L 251.52, 862.88 251.52, 863.2 143.04, 863.2Z" />
<!--System.Windows.Shapes.Path-->
<Path Fill="#FF000000" Data="F1 M 251.52, 862.88 L 251.84, 862.88 251.84, 863.2 251.52, 863.2Z" />
<!--System.Windows.Shapes.Path-->
<Path Fill="#FF000000" Data="F1 M 251.84, 862.88 L 723.36, 862.88 723.36, 863.2 251.84, 863.2Z" />
<!--System.Windows.Shapes.Path-->
<Path Fill="#FF000000" Data="F1 M 142.08, 914.08 L 252, 914.08 252, 914.4 142.08, 914.4Z" />
<!--System.Windows.Shapes.Path-->
<Path Fill="#FF000000" Data="F1 M 251.04, 914.08 L 251.36, 914.08 251.36, 914.4 251.04, 914.4Z" />
<!--System.Windows.Shapes.Path-->
<Path Fill="#FF000000" Data="F1 M 251.36, 914.08 L 723.84, 914.08 723.84, 914.4 251.36, 914.4Z" />
</FixedPage>
```

Fig. 19

FixedPage_1Structure.txt

```
<StoryFragments
    xmlns="http://schemas.microsoft.com/xps/2005/06/documentstructure"
    xmlns:x="http://schemas.microsoft.com/xps/2005/06/documentstructure"
  <StoryFragment FragmentType="Header">
   <StoryBreak/>
    <ParagraphStructure>
      <NamedElement NameReference="Pg1HeaderP1" />
    </ParagraphStructure>
   <StoryBreak/>
  </StoryFragment>
```

←410              ←2102
        <StoryFragment StoryName="DocumentBody" FragmentType="Content">
          <SectionStructure>←2104
          ┌<ParagraphStructure>←2108    ←2112
          │  <NamedElement NameReference="G1" />
   2106───┤  <NamedElement NameReference="G2" />←2114
          │  <NamedElement NameReference="G3" />←2116
          └</ParagraphStructure>←2110

┌<ParagraphStructure>
          │  <NamedElement NameReference="G4" />
   2120───┤  <NamedElement NameReference="G5" />
          │  <NamedElement NameReference="G6" />
          │  <NamedElement NameReference="G7" />
          └</ParagraphStructure>

<ParagraphStructure>
             <NamedElement NameReference="G8" />
             <NamedElement NameReference="G9" />
             <NamedElement NameReference="G10" />
             <NamedElement NameReference="G11" />
             <NamedElement NameReference="G12" />
           </ParagraphStructure>
```

```
<ParagraphStructure>
  <NamedElement NameReference="G13" />
  <NamedElement NameReference="G14" />
  <NamedElement NameReference="G15" />
  <NamedElement NameReference="G16" />
  <NamedElement NameReference="G17" />
</ParagraphStructure>

<ParagraphStructure>
  <NamedElement NameReference="G18" />
  <NamedElement NameReference="G19" />
</ParagraphStructure>

<ParagraphStructure>
  <NamedElement NameReference="G20" />
  <NamedElement NameReference="G21" />
</ParagraphStructure>

<ParagraphStructure>
  <NamedElement NameReference="G22" />
  <NamedElement NameReference="G23" />
  <NamedElement NameReference="G24" />
</ParagraphStructure>

<ParagraphStructure>
  <NamedElement NameReference="G25" />
</ParagraphStructure>

<ParagraphStructure>
  <NamedElement NameReference="G26"/>
</ParagraphStructure>
```

Fig. 22

```
                    <TableCellStructure>
                      <ParagraphStructure>
                        <NamedElement NameReference="G40" />
                        <NamedElement NameReference="G41" />
                        <NamedElement NameReference="G42" />
                        <NamedElement NameReference="G43" />
                      </ParagraphStructure>
                    </TableCellStructure>
                  </TableRowStructure>

<TableRowStructure>
                    <TableCellStructure>
                      <ParagraphStructure>
                        <NamedElement NameReference="G44" />
                        <NamedElement NameReference="G45" />
                      </ParagraphStructure>
                    </TableCellStructure>
                    <TableCellStructure>
                      <ParagraphStructure>
                        <NamedElement NameReference="G46" />
                        <NamedElement NameReference="G47" />
                        <NamedElement NameReference="G48" />
                      </ParagraphStructure>
                    </TableCellStructure>
                  </TableRowStructure>

<TableRowStructure>
                    <TableCellStructure>
                      <ParagraphStructure>
                        <NamedElement NameReference="G49" />
                        <NamedElement NameReference="G50" />
                      </ParagraphStructure>
                    </TableCellStructure>
                    <TableCellStructure>
                      <ParagraphStructure>
                        <NamedElement NameReference="G51" />
                        <NamedElement NameReference="G52" />
                        <NamedElement NameReference="G53" />
                      </ParagraphStructure>
                    </TableCellStructure>
                  </TableRowStructure>

</TableRowGroupStructure>
              </TableStructure>       ← 2306
            </SectionStructure>
          </StoryFragment>
```

```xml
<StoryFragment FragmentType="Footer">
  <ParagraphStructure>
    <NamedElement NameReference="Pg1FooterP1" />
  </ParagraphStructure>
  <ParagraphStructure>
    <NamedElement NameReference="Pg1FooterP2" />
  </ParagraphStructure>
</StoryFragment>

</StoryFragments>
```

Fig. 25

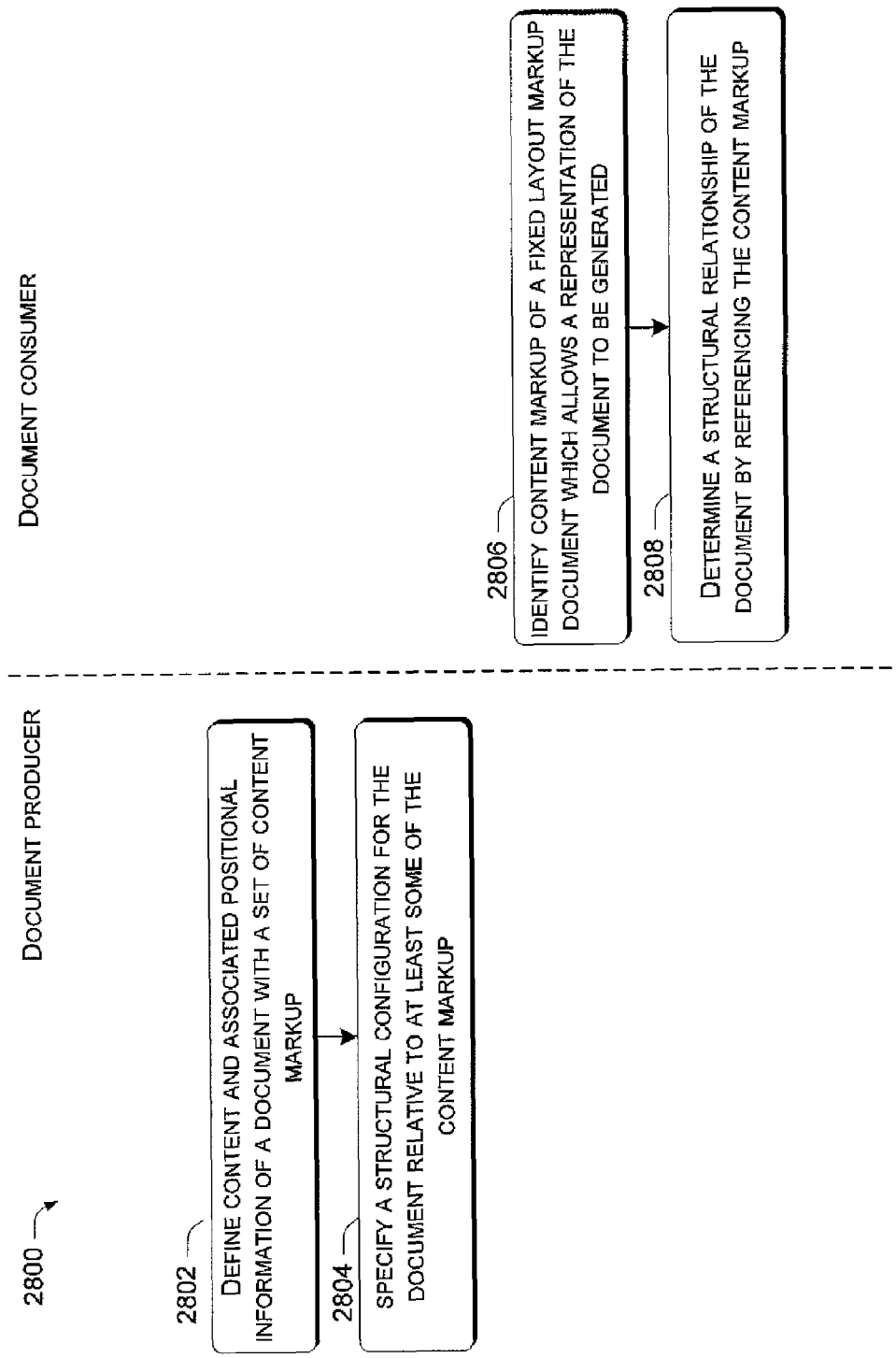

STRUCTURAL CONTEXT FOR FIXED LAYOUT MARKUP DOCUMENTS

CROSS-REFERENCE TO RELATED APPLICATIONS

This patent application is related to pending U.S. patent application Ser. No. 11/275,853, filed Jan. 31, 2006, entitled "Story Tracking for Fixed Layout Markup Documents," commonly assigned to the assignee hereof, and hereby incorporated by reference.

BACKGROUND

Modern documents are often defined using a markup language such as XML or HTML and described as markup documents. Modern documents may also be classified as fixed layout documents or adaptive documents. Adaptive documents re-layout the contents of the document based on the desired overall size of the content, such as a single sheet of paper or the size of a display window. Fixed layout documents describe where each discrete unit of a page's content, such as an image or a single run of text, is positioned on the page. Fixed layout documents are also frequently markup documents. The XML Paper Specification (XPS) describes one such document format (the XPS Document format) that is a fixed layout document and also a markup document.

Fixed layout markup document formats, such as the XPS Document format, define a document as a set of markup elements. Individual markup elements define portions of document content and a location where the content should be displayed within the document. Fixed layout markup document formats do not natively handle structural information relating to the document markup; such as to recognize that a particular portion of the markup represents a portion of a paragraph, a cell of a table, a header, or a footer, among others. Accordingly, fixed layout markup document formats do not readily establish a structural context for document markup.

SUMMARY

Techniques relating to structural context for fixed layout markup documents are described. In one instance, a process defines content and associated positional information of a document with a set of content markup. The process also specifies a structural configuration for the document relative to at least some of the content markup, such that the structural configuration is separate from the content markup.

BRIEF DESCRIPTION OF THE DRAWINGS

FIG. 2 illustrates a document representation of another fixed layout markup document in accordance with one implementation.

FIGS. 5-19 illustrate markup of the first markup set summarized in FIG. 3 in accordance with one implementation.

FIGS. 20-25 illustrate markup of the second markup set summarized in FIG. 4 in accordance with one implementation.

FIG. 28 illustrates an exemplary process diagram relating to fixed layout markup documents and associated structural context in accordance with one implementation.

DETAILED DESCRIPTION

Overview

Figure 1:
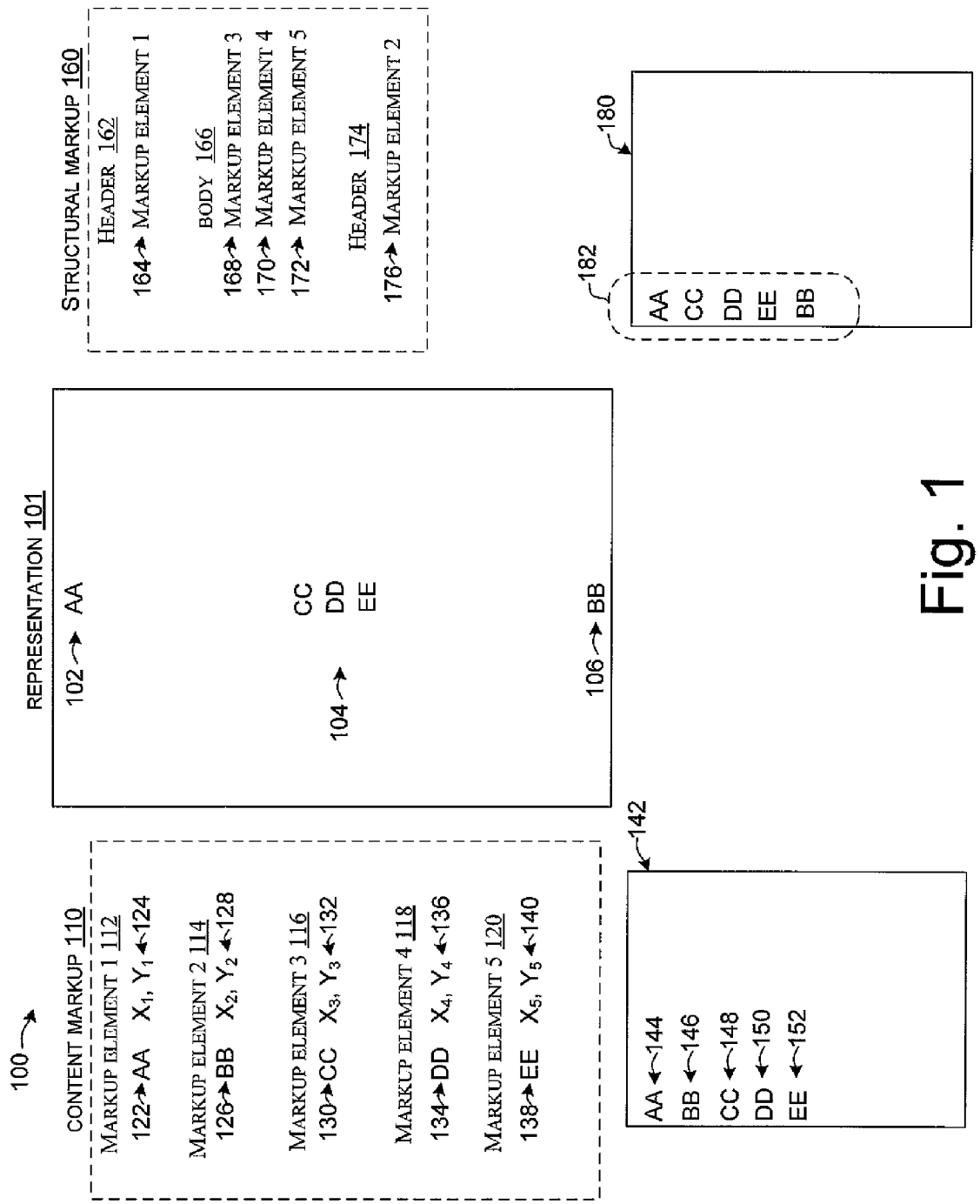
FIG. 1 illustrates a fixed layout markup document and an associated structural context in accordance with one implementation.

Techniques relating to specifying a structural context for fixed layout markup documents are described. Fixed layout documents based on a markup language utilize a set of markup elements (hereinafter "content markup") to define portions of the document's content and various properties associated with the content, such as a specific location where the content portions appear within fixed layout markup document. The content markup includes markup elements that can define a document sufficiently that a representation of the fixed layout markup document can be generated. For instance, the representation can be displayed on a monitor or printed as a hardcopy. While the content markup is sufficient to generate an intended representation of the content within the fixed layout markup format, the content markup falls short in other scenarios. For instance, in these fixed layout markup documents a sequence of the markup elements of the content markup set does not necessarily match the expected structural order of the document. So for example, a markup order of the content markup may not correspond to a reading order of the fixed document. As such, relying on the markup order in a copy-and-paste scenario into another document format may produce an improper reading order of the content copied from the content markup.

The described techniques provide a structural context for the content markup. The structural context allows various functionalities to be achieved which are not achievable with the content markup alone. For instance, the structural context can, for example, define a reading order for the fixed layout markup document's content. So for instance, if a user copies and pastes all or a portion of the document's content defined by the content markup, the intended reading order is maintained. In another example, the structural context serves to organize markup elements of the content markup set in specific configurations. In one such case, the structural context indicates that content defined by a sub-set of the content markup relates to cells in a table and a relative relationship of those cells. These techniques can allow the table to be recreated in a copy-and-paste scenario. Still another example includes text-to-voice or "screen reading". This example is described below in relation to an accessibility functionality example.

In some scenarios, structural context is provided for the fixed layout markup document by additional document markup which is separate from, but references, the content markup. This additional markup is referred to hereinafter as "structural markup". Maintaining the structural markup set separately from the content markup set allows the structural markup set to be accessed on an as needed basis. For instance, if a document consumer, such as a printer driver, wants to print the fixed layout markup document, then the document consumer can simply access the content markup which can contain sufficient information to print the document. In such a scenario the document consumer need not access the structural markup. On the other hand, if a document consumer is implementing a user's copy-and-paste command, then the document consumer can access both the content markup and the structural markup. By accessing both the content markup and the structural markup, the document consumer is able to obtain the user's desired content and a structural context for that content such as a reading order and/or whether the content consists of headers, footers, lists, or tables among others. Stated anther way, the structural markup defines inter-relationships (e.g.reading order, tables etc.) of some or all of the markup elements of the content markup. In such a scenario, the structural markup can be thought of as being superimposed over the content markup to provide the structural context to the document's content conveyed by the content markup. A document consumer is more likely to be able to accomplish user commands consistent with the user's expectations by utilizing both the content markup and the structural markup. Maintaining the structural markup separately from the content markup alternatively or additionally allows the structural markup to be created at the same time as the content markup or to be created at a subsequent time without altering the content markup.

The examples described below are provided in a context of page-based fixed layout markup documents which are easily illustrated for purposes of explanation. The techniques are equally applicable to other fixed layout markup document configurations. A page-based fixed layout markup document is divided into pages or 'page parts' and content markup is defined as occurring at a specific address or location on an individual page.

Exemplary Techniques

FIG. 1 serves as an example for specifying a structural configuration for fixed layout markup document. FIG. 1 illustrates an example of a simplified fixed layout markup document generally at 100 from which a visual representation 101 can be generated. Representation 101 includes a header 102 having hypothetical content "AA", a body 104 including three lines of hypothetical content "CC", "DD", and "EE", and a footer 106 having hypothetical content "BB". A first set of hypothetical document markup or content markup is indicated generally at 110 for generating document representation 101. The content markup 110 defines portions of document content and specific locations for the content portions on the representation 101. The content markup 110 includes a first markup element or markup element I indicated at 112, a markup element 2 as indicated at 114, a markup element 3 as indicated at 116, a markup element 4 as indicated at 118, and a markup element 5 as indicated at 120.

Markup element 1 (112) defines document content via a content portion "AA" as indicated at 122 and a location for the content portion as hypothetical X and Y coordinates represented as $X_1, Y_1$ as indicated at 124. Similarly, markup element 2 defines a content portion as "BB" as indicated at 126 and the location for the content portion as $X_2, Y_2$ as indicated at 128. Markup element 3 defines a content portion as "CC" as indicated at 130 and the location for the content portion as $X_3, Y_3$ as indicated at 132. Markup element 4 defines a content portion as "DD" as indicated at 134 and the location for the content portion as $X_4, Y_4$ as indicated at 136. Finally, markup element 5 defines a content portion as "EE" as indicated at 138 and the location for the content portion as $X_5, Y_5$ as indicated at 140.

Content markup 110 is sufficient to allow representation 101 to be generated by a producer of the document or document producer. However, consider a scenario where a user acting upon a document consumer attempts to copy the content 102-106 of representation 101 and paste the content into a non- fixed layout markup document application, such as an adaptive type document format. An example of an adaptive type format is one in which all content effectively occurs within a single unit or container. When a representation is generated of the content a relative location of any specific content is dependent upon any preceding content. For instance, the specific content may be moved from the bottom of one page to the top of the next page simply by adding content above it. One example of a copy-and-paste scenario involving content 102-106 into an adaptive type document format is illustrated generally in representation 142 where content 102-106 is represented according to the markup order of the content markup 110. Accordingly, content AA of markup element 1 is manifested first, as indicated at 144, followed by content BB of markup element 2 as indicated at 146. The content of markup elements 3-5 is listed last as indicated at 148, 150, and 152 respectively. A comparison of representation 101 and representation 142 shows that the reading order of the content of representation 142 follows the markup order of content markup 110 (e.g. the reading order of representation 142 is AA, BB, CC, DD, and EE). In contrast, representation 101 has a reading order of AA, CC, DD, EE, and BB. So, rather than reading header, body, and footer, representation 142 reads header, footer, then body.

A second markup set or structural markup 160 contains additional document markup which provides a structural context for the document content conveyed by content markup 110. In this instance, structural markup 160 is organized for categorizing the content of the document. Within each category, structural markup 160 lists the associated markup elements from content markup 110. For example, under a designation of "header" as indicated at 162 is listed markup element 1 as designated at 164 which corresponds to markup element 1 indicated at 112 in content markup 110. Similarly, under a designation of "body" as indicated at 166 are listed markup elements 3, 4, and 5 as indicated at 168, 170, and 172, respectively. A farther designation of "footer" indicated at 174 includes markup element 2 as indicated at 176.

Consider again the example described above where a document consumer attempts to accomplish a user's copy-and-paste command of the content of representation 101. The document consumer can obtain the content from content markup 110 and can also obtain a structural context for that content from structural markup 160. In this example, one aspect of the structural context is the reading order. Structural markup 160 indicates the reading order of the referenced markup elements from top to bottom. So in this instance, the reading order is markup element 1 followed by markup elements 3-5 and finally markup element 2. Further, in this example structural markup 160 indicates that markup element 1 relates to the document's header, that markup elements 3-5 relate to a body of the document, and that markup element 2 relates to a footer. Accordingly, the document consumer can utilize the document's content markup 110 in combination with the document's structural markup 160 to generate a representation in other document formats which is consistent with the representation 101. For instance, consider representation 180 which maintains the reading order of the document's content as manifested in representation 101. Specifically as indicated at 182 the reading order from top to bottom is AA, CC, DD, EE, and BB. This is but one simplified example of the structural context information which can be conveyed by the structural markup. Other examples of how a structural markup can provide structural context for a document's content markup are described below.

FIGS. 2-24 relate to another example for specifying a structural context for fixed layout markup documents. Due to the size constraints of the physical drawing pages upon which FIGS. 2-24 appear, these Figures are spread over multiple drawing pages.

FIGS. 2-24 relate to an example of a fixed layout markup document which represents the document's content on a series of fixed pages. This particular fixed layout markup document is generated utilizing an XML Paper Specification (XPS) document format, developed by Microsoft Corporation of Redmond Wash. Details regarding the XPS document format are publicly available at the website for Microsoft Corporation. As should be recognized by the skilled artisan the XPS Document format provides but one example of fixed layout markup document formats. For instance, other implementations could utilize other markup languages with differently named tags and attributes. In one case, tags similar to those shown below could be added to Scalable Vector Graphics (SVG).

Figure 3:
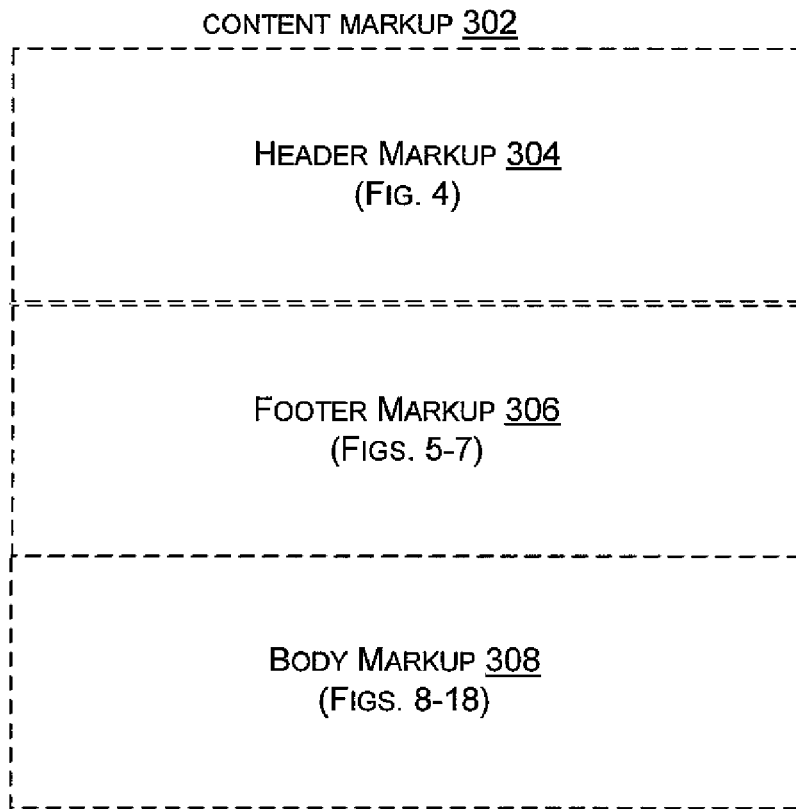
FIG. 3 illustrates a summarization of a first markup set relating to the document representation of FIG. 2 in accordance with one implementation.
Figure 4:
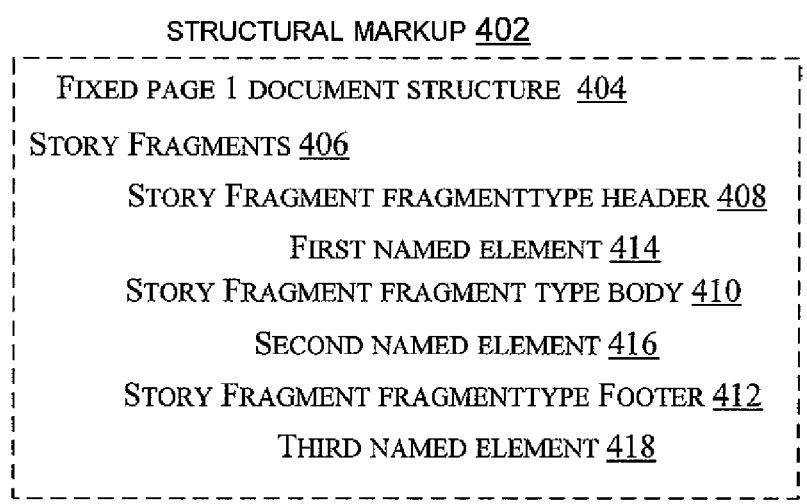
FIG. 4 illustrates a summarization of a second markup set relating to the document representation of FIG. 2 in accordance with one implementation.

FIG. 2 illustrates a representation 202 similar to representation 101 described above in relation to FIG. 1. FIG. 3 illustrates a summarized representation of a first markup set or content markup from which representation 202 can be generated. FIGS. 5-19 illustrate specific portions of the content markup as indicated in FIG. 3. FIG. 4 illustrates a summarized representation of a second markup set or structural markup which can provide a structural context to the content markup. FIGS. 20-25 illustrate specific portions of the structural markup as indicated in FIG. 4.

As illustrated in FIG. 2, representation 202 can be described in relation to a header 204, a footer 206, and a body 208. The body 208 can be further organized into a number of paragraphs indicated generally at 210 and a table 212. Techniques for generating these features and for generating associated document structure will be described in more detail below in relation to FIGS. 3-25.

FIG. 3 illustrates a block diagram of a content markup 302 from which representation 202 can be generated. Due to the length (e.g. number of lines) of code contained in content markup 302, the actual markup is illustrated on multiple drawings pages as FIGS. 5-19 as indicated in FIG. 3. Content markup 302 is organized into three basic blocks for purposes of explanation. The three basic blocks include header markup block 304, footer markup block 306, and body markup block 308. The three blocks are consistent with the markup order of content markup 302, e.g. the markup order of content markup 302 is header, foot, body. The blocks 304-308 are intended for facilitating the following discussion and individual blocks may contain code which does not fall within the specific name of the block. Further, as should become apparent in the following discussion, content markup 302 does not readily convey any organizational structure of the document and these three blocks are contrived for purposes of discussion. An organizational structure or structural context is instead conveyed by structural markup which is described below in relation to FIGS. 4 and 20-25.

FIG. 4 illustrates a summarized version of structural markup 402 which is represented in FIGS. 20-25. Structural markup 402 provides a document's organizational structure or structural context for fixed page 1 as indicated at 404. Fixed page 1 is illustrated as representation 202 in FIG. 2. In this particular configuration, structural markup 402 characterizes content markup 302 in terms of story fragments as one aspect of the organizational structure. Story fragments can be thought of as portions of a story which appear on an individual fixed page. A story can be thought of as individually readable content of a document. In some cases a document can be composed of a single story, such as with a typical memorandum or essay. In other cases, such as are often encountered with newspapers and magazines, a single document can contain multiple stories which can be spread over multiple pages. The example described in relation to FIGS. 2-25 relates to a single fixed page of a document which relates to a single story. Other examples can involve multiple pages and/or multiple stories. In such a scenario, the document's organizational structure as defined by the structural markup can include a listing of which stories occur on which pages of the document. Such a configuration can allow a document consumer to access only those pages, or corresponding content markup, on which a particular story of interest occurs.

Structural markup 402 relates three story fragments 406 of fixed page 1. In this instance, the three story fragments include a "header" story fragment type 408, a "body" story fragment type 410, and a "footer" story fragment type 412. The story fragments 408-412 reference named elements of the content markup 302. For discussion purposes, a hypothetical first named markup element 414 is illustrated in relation to story fragments type header 408, a second named markup element 416 is illustrated in relation to story fragment type body 410, and a third named markup element 418 is illustrated in relation to story fragments type footer 412. Specific named elements are described below in relation to the content markup in FIGS. 5-19. Some of these specific named elements are then referenced below in FIGS. 20-25.

Organizing markup into story fragments provides but one example of the organizational structure which can be supplied by structural markup 402. Still another example of organizational structure further groups named elements of a particular story fragment as contributing to a particular structure of the document or 'document structure'. For instance, a particular story fragment can specify that one or more named elements of the story fragment are arranged as cells of a table, as a list, or as any other useful characterization which contributes information relating to the document's overall structural configuration. Examples of such scenarios are described below.

FIG. 5 illustrates header markup 304 as indicated in FIG. 3. The illustrated header markup 304 follows markup indicated generally at 502 which describes the fixed page dimensions. In this particular case, multiple markup elements or glyphs relating to the header markup are grouped under a common heading or "canvas". For instance, a canvas 504 is named "Pg1headerP1" indicated at 506 and which stands for fixed page 1 header part 1. Canvas 504 groups four glyphs 508, 510, 512, and 514. Individual glyphs convey content for fixed page representation 202 of FIG. 2 and various properties related to content of the representation. For instance, glyph 508 conveys content "XPS" as indicated at 516 and various properties including font size 518 and location coordinates 520 relative to fixed page 1.

FIGS. 6-8 illustrate footer markup 306 in a similar manner to the header markup 304 described above in relation to FIG. 5. The footer markup relates to a named element PG1footerP1 602 evidenced on FIG. 6 and to PG1footerP2 602 evidenced on FIG. 7 and continued on to FIG. 8. Analogous to the header markup, the footer markup conveys content and properties of the content including location information relative to the fixed page.

FIGS. 9-19 illustrate body markup 308 for conveying the content of the body 208 of representation 202 (designated in relation to FIG. 2). The body markup relates to 53 named markup elements or glyphs which are indicated as glyphs G1-G53 (not all of which are referred to with specificity). Individual glyphs convey a portion of the document's content and various properties related to the content. For instance, glyph &1 as indicated generally at 902 conveys content "Chapter 1." as indicated at 904 and associated properties such as font size 906 and location coordinates 908 relative to the fixed page. Similarly, glyph G2 as indicated generally at 912 conveys content " " (a space) as indicated at 914, and associated properties relating to fonts at 916, and location coordinates at 918. Further, glyph G3, as indicated generally at 922, conveys content "The XPS document Format" as indicated at 924, and associated properties relating to fonts at 926, and location coordinates at 928. Further still, glyph G4 as indicated generally at 930 conveys content "This specification describes a set of conventions for how the XPS Document file format is organized" as indicated at 932 and various associated properties as indicated generally at 934. Glyph G5 as indicated generally at 936 conveys content "internally and rendered externally. It is built upon the principles described in the Open Packaging" as indicated at 938 and various associated properties as indicated generally at 940. Glyph G6 as indicated generally at 942 conveys content "Conventions specification and incorporates the requirements and recommendations of that specification," at 944 and various associated properties as indicated generally at 946. Glyph G7 as indicated generally at 948 conveys content "except where indicated otherwise." as indicated at 950 and various associated properties as indicated generally at 952.

FIGS. 20-25 relate to structural markup 402 which is described briefly above in relation to FIG. 4. The structural markup provides a structural context for the content markup 302 described in relation to FIGS. 3 and 5-19. As illustrated at FIG. 20 7 structural markup 402 relates to Fixed page 1 as indicated at 2002. Further, the structural markup 402 provides a document structure functionality and has a descriptive name of "DocumentStructures" as indicated at 2004. Story fragments section 406 contains individual story fragments for the header 408, body 410 (FIG. 21), and footer 412 (designated toward the end of the structural markup 402 on FIG. 25).

In this configuration, as will be described below, the story fragments section 406 provides a reading order for fixed document representation 202 which is separate from, and independent of, the markup order of the content markup 302. The story fragments feature provides a structural context by characterizing the document's content into different story fragments which in this instance function as sections. In this example, those sections are header, body and footer but other characterizations could be utilized. Within the story fragments section 406, individual story fragments can reference specific markup elements or groups of markup elements from content markup 302. For instance, in reference to header story fragment 408, the second markup set references on FIG. 20 a nameReference "PG1HeaderP1" named element 506 from the content markup which is described above in relation to FIG. 5. This configuration provides at least two structural context aspects. First, the structural markup specifies that the named element "PG1HeaderP1" of the content markup relates to a header of the page. Second, as indicated in the structural markup beginning at FIG. 20, the named element "PG1HeaderP1" is the content markup of the fixed page for purposes of reading order.

The two aspects of structural context provided by the structural markup described above are but two of many potential examples. Further examples are described below. Several structural context aspects are described below by way of example in relation to the document's body or document body story fragment 410 introduced in relation to FIG. 4. As can best be appreciated from FIGS. 21-24, body story fragment 410 references 53 named elements (G1-G53) of the content markup 302. The named elements G1-G53 relate to content of the document as indicated at 2102. Other named elements can relate to images or links among others. Beginning with a section structure heading 2104, document body story fragment 410 characterizes a role of individual referenced markup elements G1-G53. For instance, as indicated generally at 2106 the first three referenced elements G1-G3 contribute content of a single paragraph of the document. Specifically, at 2108 the structural markup indicates a start of a paragraph which ends at 2110. The paragraph defined between designator 2108 and designator 2110 references three markup elements G1, G2, and G3 and their relative reading order within the paragraph at 2112, 2114, and 2116 respectively.

The structural markup described above in relation to indicators 2106-2116 provides a structural context for the corresponding markup elements of the content markup. Glyphs G1-G3 were introduced above in relation to designators 902-928 of FIG. 9. As specified at 904 on FIG. 9, glyph G1 conveys content "Chapter 1.", glyph G2 conveys content " " as indicated at 914, and glyph G3 conveys content "The XPS document format" at 924. Information conveyed by the structural markup in combination with information from the content markup can enable functionalities that are otherwise unachievable. For example, one such functionality can be to allow the user to "select the current paragraph" or to "advance to the next paragraph". In another example, as mentioned above, the document consumer can recognize from the structural markup's reference to glyphs G1-G3 at 2106-2116 that the three glyphs relate to a single paragraph as indicated at 2106. The document consumer can access the content conveyed by the three glyphs to aggregate the content of the paragraph which reads:

"Chapter 1. The XPS document Format".

The document consumer can generate this paragraph configuration independent of the glyphs' location data described above in relation to FIG. 9. Stated another way, by utilizing the content of the content markup and the structural context of the structural markup, content can be properly displayed in a document format scenario where the associated glyph location information conveyed at 908, 918 and 928 is not recognized and/or applicable.

Similarly, the document consumer can ascertain from the structural markup as indicated generally 2120 that the next paragraph of the document's reading order is conveyed by glyphs G4-G7. These glyphs are introduced above in FIG. 9 in relation to designators 930-952. The structural markup provides a structural context for the content of glyphs G4-G7. Utilizing the two markup sets the document consumer can generate a definition of the document's second paragraph outside of the scope of the fixed layout markup document. In this instance, the structural markup provides the reading order of glyphs G4-G7 as indicated at 2120. The content markup conveys the content of the paragraph as indicated at 932, 940, 946, and 952 of FIG. 9. The document consumer, regardless of whether it is functioning in a fixed page format can acquire the content from the content markup and the information that the content relates to a single paragraph and a reading order of the paragraph from the structural markup to recreate a paragraph which reads:

"This specification describes a set of conventions for how the XPS Document file format is organized internally and rendered externally. It is built upon the principles described in the Open Packaging Conventions specification and incorporates the requirements and recommendations of that specification, except where indicated otherwise."

Both of the above mentioned quoted paragraphs are consistent with the content of document representation 202 as evidenced in FIG. 2, but can be generated independently of the fixed layout markup format utilized to generate representation 202.

The skilled artisan should recognize that such a configuration can lend itself to various scenarios. For instance, a document producer can generate both the content markup and the structural markup. The document producer can generate the content markup and the structural markup at generally the same time or the document producer can generate the content markup and then create the structural markup at a subsequent time. Alternatively, the document producer can generate only the content markup. A second party can subsequently generate the structural content relating to the document's content markup to provide a semantic understanding of the document content. An example of such a second party can be a company who wishes to republish documents with greater accessibility functionality for disabled users, among others.

Figure 23:
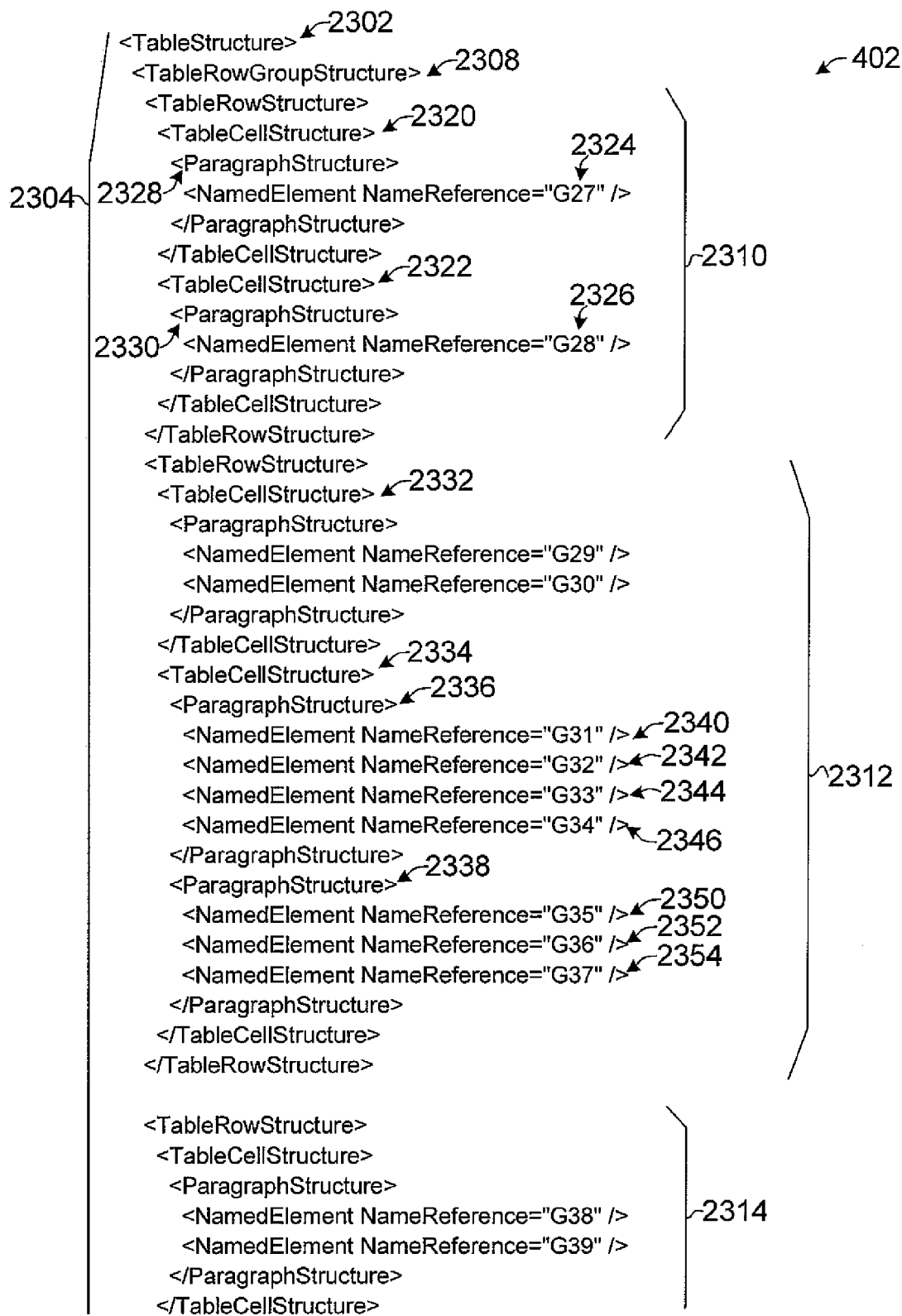

The functionalities of the structural markup are extensible to convey other aspects of the structural context of the content markup. For instance, FIGS. 23-24 illustrate an example of how the structural markup 402 can convey that specific markup elements of the content markup are arranged in a table configuration. In this instance, the existence of a table structure 2302 within the document body is indicated in FIG. 23. Details of the table structure 2302 extend from the markup of FIG. 23 and onto FIG. 24 as indicated generally at 2304. The table structure concludes on FIG. 24 as indicated at 2306. In this particular implementation, the table structure 2304 is organized as a table row group structure 2308. The table row group structure is organized into one or more table row structures. In this particular instance, the table row group structure includes five table row structures 2310, 2312, 2314, 2316, and 2318 corresponding to the five rows illustrated in the table of FIG. 2. Individual table row structures include one or more table cell structures (not all of which are designated with specificity). The table cell structure represents the number of table cells in the table row and specifies content of individual table cells. For instance, table row structure 2310 includes two cells or cell structures 2320, 2322. The first cell 2320 relates to named glyph G27 of the first markup set as indicated at 2324 and the second cell 2322 relates to named glyph G28 as indicated at 2326. Each of the glyphs G27, G28 represents a paragraph of content as indicated generally at 2328 and 2330 respectively In each of these instances, the table cells include a single paragraph comprising a single markup element or glyph.

Table row 2312 has first and second cells 2332 and 2334. Table cell 2334 offers an example where the cell includes two paragraphs 2336 and 2338 each of which contains multiple glyph elements. Paragraph 2336 contains glyphs G31-G34 as indicated at 2340, 2342, 2344, and 2346 respectively, while paragraph 2338 contains glyphs G35-G37 as indicated at 2350, 2352, and 2354 respectively.

A document consumer can utilize the structural context provided by the structural markup to accomplish functionalities that might not otherwise be readily achieved. For instance, in an accessibility scenario, a user may position his/her cursor over a portion of table 212 represented in FIG. 2. For purposes of explanation assume that the cursor is positioned over a line of content designated in FIG. 2 as 214. The accessibility functionality can search the content markup to find a markup element which specifies content for that location. In this instance, assume that location of the cursor corresponds to the location information 1402 of named markup element "G32" which is represented as 1404 on FIG. 14. As indicated at 1406, named markup element G32 conveys content "described in Open Packaging Conventions specification) to organize its data. All". Without further context, this content which includes portions of two sentences has limited value to the user.

The accessibility functionality can examine the structural markup 402 for structural context information relating to named markup element G32 of the content markup. In this instance, named markup element G32 is referenced on FIG. 23 at 2342. Among other information, the structural markup indicates that named markup element G32 is the second of four named markup elements indicated at 2340-2346 relating to a single paragraph of the document as indicated by paragraph structure 2336. Further, in ascending hierarchical order, the structural markup indicates that the paragraph indicated at 2336 and a second paragraph indicated at 2338 and including named markup elements G35-G37 indicated at 2350-2354 relate to single table cell as indicated at 2334. Correspondingly, table cell 2334 is the second table cell of a table row indicated at 2312. (The first table cell being indicated at 2332). Further, table row 2312 is the second of five table rows (2310-2318) of a table row structure of a table 2302. Similarly, table 2302 follows several paragraphs such as 2106 and 2120 in a story fragment relating to a body of the document as indicated at 410.

The accessibility functionality can utilize structural markup in various ways to satisfy user expectations. For instance, since the structural markup specifies that markup elements G31-G37 (indicated at 2340-2354) convey the content of table cell 2312, the accessibility functionality can access these named elements in the content markup. So for example, the accessibility functionality could utilize the information and generate an audible signal for the user that the specified portion of the document relates to a second cell of a second row of a table of the document. The accessibility functionality could then generate an audible signal based upon the content of the content markup's named elements G31-G37. This is but one example of how a document consumer can utilize the structural context provided by the structural markup. The structural context can similarly allow other functionalities outside of the accessibility arena to be achieved as should be recognized by the skilled artisan.

In the example described in relation to FIGS. 2-25, structural markup 402 has a nested hierarchical relationship which can relate increasing details of structural context of the document as desired. In this instance, the structural markup specifies that the content markup relates to a set of three story fragments. The second markup then specifies paragraphs of each story fragment and the named elements of the content markup which convey content to an individual paragraph.

Further, in an instance where a story fragment has additional structures such as a table, the structural markup specifies the structure utilizing the same nested hierarchical configuration. For instance, in the table example, the structural markup specifies that the table includes multiple table rows. In relation to individual table rows the structural markup specifies that the row includes multiple table cells. The structural markup then specifies the paragraphs of an individual cell and the content for each paragraph. As should be recognized by the skilled artisan, the nested hierarchical configuration can encompass other document structural context aspects than those described above.

The above discussion in relation to FIGS. 2-25 provides a detailed example of techniques for providing a structural context for content markup in a fixed layout markup document format. FIG. 1 and its related discussion provides another example. The skilled artisan should recognize many other implementations which involve a first set of markup for defining content of a fixed layout markup document and additional markup which can provide a structural context in relation to the first set of markup. The structural context provided by the additional markup can be accessed by document consumers to accomplish functionalities which might not be achieved from the first markup set alone.

Exemplary Systems

Figure 26:
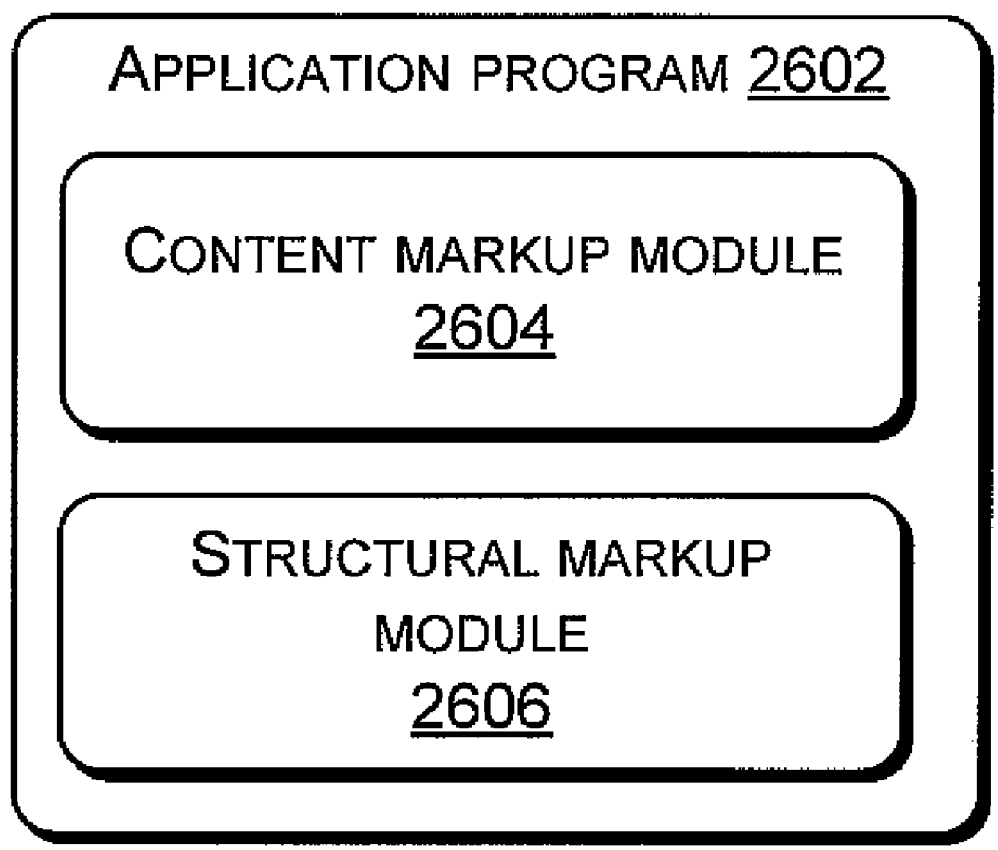
FIG. 26 illustrates a system relating to providing a structural context for fixed layout markup documents in accordance with one implementation.

FIG. 26 illustrates a system 2600 for generating fixed layout markup document. System 2600 includes an application program 2602, a content markup module 2604, and structural markup module 2606. An example of a contextual environment for system 2600 is described below in relation to FIG. 27.

Application program 2602, via content markup module 2604, is configured to generate a fixed layout markup document as content markup elements which specify the document's content and layout. The programmed application can generate the documents in various fixed formats such as SVG. In some configurations, application program 2602 can be configured to generate the fixed layout markup document as a set of fixed pages where markup content is specified as occurring at a specific location on a particular page.

Application program 2602 is further configured via content markup module 406 to generate a structural markup which conveys an organizational structure to the content markup. In at least some instances, the document's structural markup references, but is distinct from the content markup to allow the structural markup to be accessed on an as needed basis by subsequent document consumers.

Figure 27:
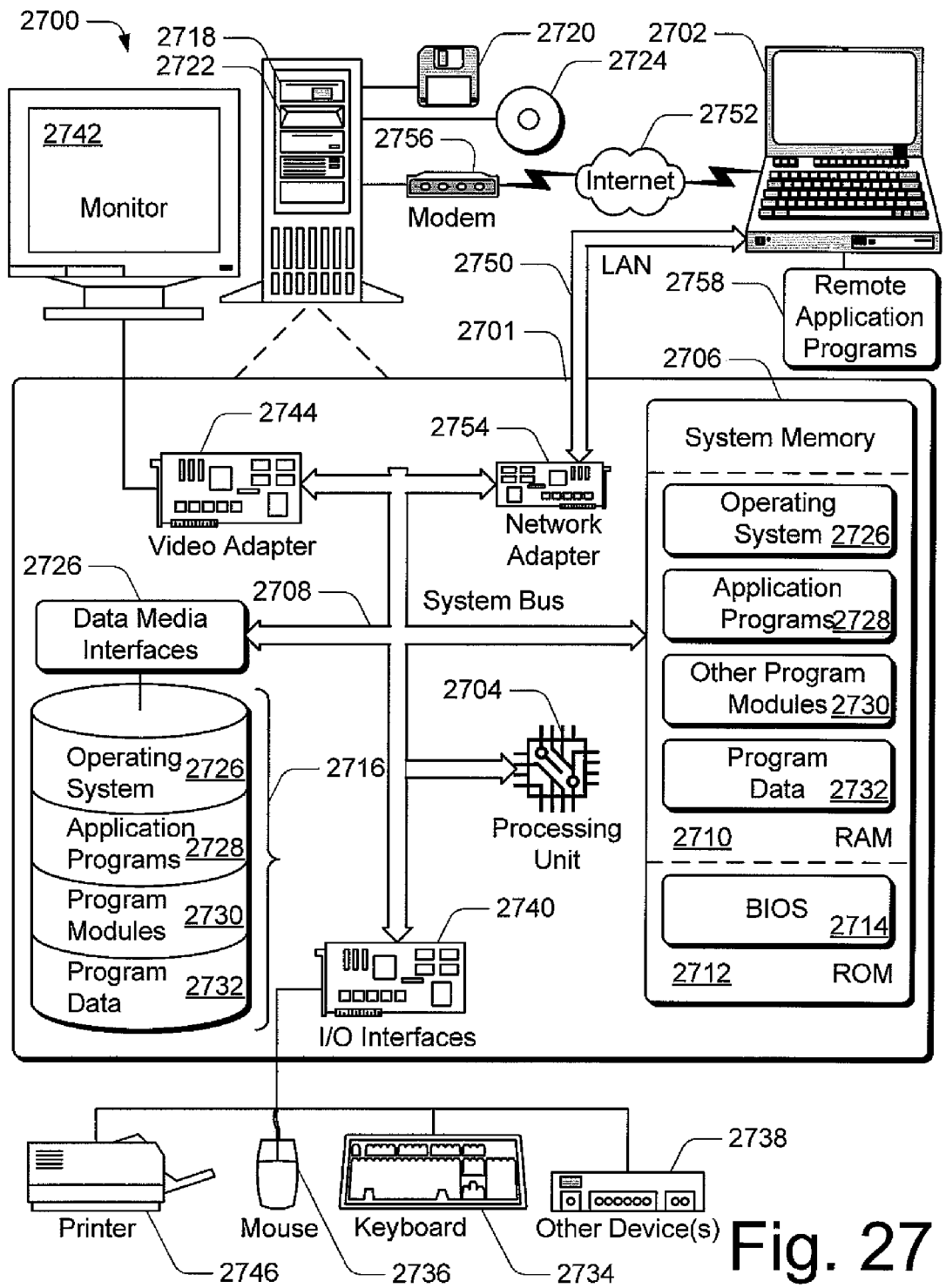
FIG. 27 illustrates exemplary systems, devices, and components in an environment in which fixed layout markup documents that include a structural context can be processed in accordance with one implementation.

FIG. 27 represents an exemplary system or computing environment 2700 upon which fixed layout markup documents having associated structural context may be implemented. System 2700 includes a general-purpose computing system in the form of a first machine 2701 and a second machine 2702.

The components of first machine 2701 can include, but are not limited to, one or more processors 2704 (e.g., any of microprocessors, controllers, and the like), a system memory 2706, and a system bus 2708 that couples the various system components. The one or more processors 2704 process various computer executable instructions to control the operation of first machine 2701 and to communicate with other electronic and computing devices. The system bus 2708 represents any number of several types of bus structures, including a memory bus or memory controller, a peripheral bus, an accelerated graphics port, and a processor or local bus using any of a variety of bus architectures.

System 2700 includes a variety of computer readable media which can be any media that is accessible by first machine 2701 and includes both volatile and non-volatile media, removable and non-removable media. The system memory 2706 includes computer-readable media in the form of volatile memory, such as random access memory (RAM) 2710, and/or non-volatile memory, such as read only memory (ROM) 2712. A basic input/output system (BIOS) 2714 maintains the basic routines that facilitate information transfer between components within first machine 2701, such as during start-up, and is stored in ROM 2712. RAM 2710 typically contains data and/or program modules that are immediately accessible to and/or presently operated on by one or more of the processors 2704.

First machine 2701 may include other removable/non-removable, volatile/non-volatile computer storage media. By way of example, a hard disk drive 2716 reads from and writes to a non-removable, non-volatile magnetic media (not shown), a magnetic disk drive 2718 reads from and writes to a removable, non-volatile magnetic disk 2720 (e.g., a "floppy disk"), and an optical disk drive 2722 reads from and/or writes to a removable, non-volatile optical disk 2724 such as a CD-ROM, digital versatile disk (DVD), or any other type of optical media. In this example, the hard disk drive 2716, magnetic disk drive 2718, and optical disk drive 2722 are each connected to the system bus 2708 by one or more data media interfaces 2726. The disk drives and associated computer readable media provide non-volatile storage of computer readable instructions, data structures, program modules, and other data for first machine 2701.

Any number of program modules can be stored on the hard disk 2716, magnetic disk 2720, optical disk 2724, ROM 2712, and/or RAM 2710, including by way of example, an operating system 2726, one or more application programs 2728, other program modules 2730, and program data 2732. Each of such operating system 2726, application programs 2728, other program modules 2730, and program data 2732 (or some combination thereof) may include an embodiment of the systems and methods described herein.

A user can interface with first machine 2701 via any number of different input devices such as a keyboard 2734 and pointing device 2736 (e.g., a "mouse"). Other input devices 2738 (not shown specifically) may include a microphone, joystick, game pad, controller, satellite dish, serial port, scanner, and/or the like. These and other input devices are connected to the processors 2704 via input/output interfaces 2740 that are coupled to the system bus 2708, but may be connected by other interface and bus structures, such as a parallel port, game port, and/or a universal serial bus (USB).

A monitor 2742 or other type of display device can be connected to the system bus 2708 via an interface, such as a video adapter 2744. In addition to the monitor 2742, other output peripheral devices can include components such as speakers (not shown) and a printer 2746 which can be connected to first machine 2701 via the input/output interfaces 2740.

First machine 2701 can operate in a networked environment using logical connections to one or more remote computers, such as second machine 2702. By way of example, the second machine 2702 can be a personal computer, portable computer, a server, a router, a network computer, a peer device or other common network node, and the like. The second machine 2702 is illustrated as a portable computer that can include many or all of the elements and features described herein relative to first machine 2701.

Logical connections between first machine 2701 and the second machine 2702 are depicted as a local area network (LAN) 2750 and a general wide area network (WAN) 2752. Such networking environments are commonplace in offices, enterprise-wide computer networks, intranets, and the Internet. When implemented in a LAN networking environment, the first machine 2701 is connected to a local network 2750 via a network interface or adapter 2754. When implemented in a WAN networking environment, the first machine 2701 typically includes a modem 2756 or other means for establishing communications over the wide area network 2752. The modem 2756, which can be internal or external to first machine 2701, can be connected to the system bus 2708 via the input/output interfaces 2740 or other appropriate mechanisms. The illustrated network connections are exemplary and other means of establishing communication link(s) between the first and second machines 2701, 2702 can be utilized.

In a networked environment, such as that illustrated with System 2700, program modules depicted relative to the first machine 2701, or portions thereof, may be stored in a remote memory storage device. By way of example, remote application programs 2758 are maintained with a memory device of second machine 2702. For purposes of illustration, application programs and other executable program components, such as the operating system 2726, are illustrated herein as discrete blocks, although it is recognized that such programs and components reside at various times in different storage components of the first machine 2701, and are executed by the processors 2704 of the first machine.

Exemplary Processes

FIG. 28 illustrates an exemplary process 2800 associated with structural contexts of fixed layout markup documents. The order in which the process is described is not intended to be construed as a limitation, and any number of the described process blocks can be combined in any order to implement the process. Furthermore, the process can be implemented in any suitable hardware, software, firmware, or combination thereof. In this instance, process blocks 2802 and 2804 tend to be accomplished by a document producer where a document producer is an entity which originates or alters the document. Process blocks 2806 and 2808 tend to be accomplished by a document consumer. A document consumer can be any entity which accesses the document for any purpose or utilizes information related to the document.

At block 2802 the process defines content and associated positional information of a document with a set of content markup. The content markup can be thought of as a set of individual markup elements. Several examples are described above where the markup elements or content markup convey a document's content and associated location information for the content relative to a fixed layout markup document. In some of these examples the fixed layout markup document is a fixed page document and the location information is relative to a specific fixed page of the document.

At block 2804, the process specifies a structural configuration for the document relative to at least some of the content markup, such that the structural configuration is separate from the content markup. In some implementations, the structural context is specified via structural markup which references, but is separate from the content markup. In some instances, the process can be thought of as generating a structural markup which can be superimposed over the markup elements to provide a structural context for the content markup. The process can provide one or more of various aspects of the structural context. For instance, some process implementations specify a reading order of the document. Alternatively or additionally, other process implementations can specify various story fragments of the document and which markup elements convey content of specific story fragments. Still other processes can specify various features of the document such as which markup elements generate specific paragraphs of the document. Examples of other features which can be specified are described above and can include tables, table rows, table cells, and lists, among others. Some process configurations can employ a nested hierarchical configuration for specifying features and sub-features of the document. An example of such a configuration is described above.

On the document consumer side, process block 2806 identifies content markup of a fixed layout markup document which allows a representation of the document to be generated. At least some markup elements of the content markup convey content of the document from which a representation of the document can be generated.

Process block 2808 determines a structural relationship of the document by referencing the content markup. In some such instances, such a process block can be accomplished by accessing structural markup which references the markup elements. This structural markup can provide a structural context to the markup elements. A document consumer can utilize the structural markup to achieve various functionalities, such as accessibility functionalities and copy-and-paste scenarios among others.

Although implementations relating to structural context of fixed layout markup documents have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-implemented method, comprising:

defining, by a computing device, content and associated positional information of a fixed layout markup document with a set of content markup; and generating the fixed layout markup document comprising content markup which specifies the document's content and a location for the content in a document representation;

specifying, by the computing device, a structural configuration for the fixed layout markup document relative to at least some of the content markup, the structural configuration including a structural markup generated by the computing device that is maintained separately from, and which references, the content markup, thereby allowing the structural markup to be created either at the same time as the content markup or subsequent to the creation of the content markup without altering the content markup, wherein the structural markup characterizes the content markup in terms of one or more story fragments of a story, the story fragments being portions of the story that appear on an individual fixed page of the fixed layout markup document, wherein the specifying comprises specifying relative inter-relationships of at least some markup elements of the content markup, wherein the specifying relative inter-relationships of the at least some of the markup elements comprises defining inter-relationships between one or more of: sections, paragraphs, tables, figures, and list items, wherein the defining comprises defining a plurality of markup elements of the content markup such that individual markup elements are uniquely identified, and wherein said specifying comprises referencing individual uniquely identified markup elements according to an intended reading order of the fixed layout markup document, and wherein the structural markup is configured to define a structure of individual fixed pages of the fixed layout markup document, and wherein the structural markup is configured to define an overall document structure in one section of the fixed layout markup document and to define a structure of an individual fixed page via an individual fixed page structure section which references the content markup of the individual fixed page.

2. The computer-implemented method as recited in claim 1, wherein the specifying comprises specifying a reading order of markup elements of the content markup.

3. A computer-readable storage media comprising computer-executable instructions that, when executed by one or more processors, perform acts, comprising:

defining content and associated positional information of a fixed layout markup document with a set of content markup;

generating the fixed layout markup document comprising content markup which specifies the document's content and a location for the content in a document representation;

identifying the content markup of the fixed layout markup document which allows the representation of the fixed layout markup document to be generated; and determining a structural relationship of the fixed layout markup document by referencing the content markup, the determining including accessing a structural markup that is maintained separately, and which references, the content markup, thereby allowing the structural markup to be created either at the same time as the content markup or subsequent to the creation of the content markup without altering the content markup, wherein the structural markup characterizes the content markup in terms of one or more story fragments of a story, the story fragments being portions of the story that appear on an individual fixed page of the fixed layout markup document, wherein the determining the structural relationship comprises specifying relative inter-relationships of at least some markup elements of the content markup, and wherein the specifying of relative inter-relationships of the at least some of the markup elements comprises defining inter-relationships between one or more of: sections, paragraphs, tables, figures, and list items, wherein the identifying comprises defining a plurality of markup elements of the content markup such that individual markup elements are uniquely identified, and wherein said specifying comprises referencing individual uniquely identified markup elements according to an intended reading order of the fixed layout markup document, and wherein the structural markup is configured to define a structure of individual fixed pages of the fixed layout markup document, and wherein the structural markup is configured to define an overall document structure in one section of the fixed layout markup document and to define a structure of an individual fixed page via an individual fixed page structure section which references the content markup of the individual fixed page.

4. The computer-readable media of claim 3, wherein the identifying comprises identifying specific markup elements of the content markup.

5. The computer-readable media of claim 4, wherein the determining a structural relationship comprises determining a reading order of specific markup elements.

6. The computer-readable media of claim 3, wherein the identifying comprises accessing uniquely named markup elements of the content markup.

7. The computer-readable media of claim 6, wherein the determining comprises determining whether any of the uniquely named markup elements are organized into a structure comprising one or more of: a list, a table, and a story fragment.

8. The computer-readable media of claim 3, wherein the identifying and the determining occur in an accessibility scenario.

9. A system, comprising:

a memory;

one or more processors;

a programmed application configured to generate a fixed layout markup document comprising content markup which specifies the document's content and a location for the content in a document representation; and a structural markup module configured to define a structure of the fixed layout markup document by referencing the content markup, the document structure being maintained separately from, and referencing, the content markup, thereby allowing the document structure to be created either at the same time as the content markup or subsequent to the creation of the content markup without altering the content markup, wherein the structural markup characterizes the content markup in terms of one or more story fragments of a story, the story fragments being portions of the story that appear on an individual fixed page of the fixed layout markup document, wherein the structural markup module is further configured to specify relative inter-relationships of at least some markup elements of the content markup, and wherein the specifying relative inter-relationships of the at least some of the markup elements comprises defining inter-relationships between one or more of: sections, paragraphs, tables, figures, and list items, and wherein the defining comprises defining a plurality of markup elements of the content markup such that individual markup elements are uniquely identified, and wherein said specifying comprises referencing individual uniquely identified markup elements according to an intended reading order of the fixed layout markup document, wherein the structural markup module is configured to define a structure of individual fixed pages of the fixed layout markup document, and wherein the structural markup module is configured to define an overall document structure in one section of the fixed layout markup document and to define a structure of an individual fixed page via an individual fixed page structure section which references the content markup of the individual fixed page.

10. The system as recited in claim 9, wherein the structure comprises at least one of: a reading order, a list, and a table structure.

11. The system as recited in claim 9, wherein the programmed application is configured to generate the fixed layout markup document as one or more fixed pages.

12. The system as recited in claim 11, wherein the structural markup module is configured to define a structure of an individual fixed page via an individual fixed page document structure.

* * * * *